(12) United States Patent
Sridharan et al.

(10) Patent No.: US 12,040,927 B2
(45) Date of Patent: Jul. 16, 2024

(54) PEAK-TO-AVERAGE POWER RATIO (PAPR) REDUCTION TECHNIQUES

(71) Applicant: QUALCOMM Incorporated, San Diego, CA (US)

(72) Inventors: Gokul Sridharan, Sunnyvale, CA (US); Saeid Sahraei, San Diego, CA (US); June Namgoong, San Diego, CA (US); Peter Gaal, San Diego, CA (US); Krishna Kiran Mukkavilli, San Diego, CA (US); Tingfang Ji, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/185,644

(22) Filed: Feb. 25, 2021

(65) Prior Publication Data

US 2021/0344535 A1    Nov. 4, 2021

Related U.S. Application Data

(60) Provisional application No. 63/019,086, filed on May 1, 2020.

(51) Int. Cl.
*H04L 27/26* (2006.01)
*H04L 5/00* (2006.01)
*H04W 72/04* (2023.01)

(52) U.S. Cl.
CPC .......... *H04L 27/262* (2013.01); *H04L 5/0048* (2013.01); *H04W 72/04* (2013.01); *H04L 27/2623* (2013.01)

(58) Field of Classification Search
None
See application file for complete search history.

(56) References Cited

U.S. PATENT DOCUMENTS

| | | | |
|---|---|---|---|
| 8,891,637 B2 | 11/2014 | Kim et al. | |
| 10,938,545 B2 | 3/2021 | Islam et al. | |
| (Continued) | | | |

FOREIGN PATENT DOCUMENTS

| | | |
|---|---|---|
| CN | 101795257 A | 8/2010 |
| CN | 102263738 A | 11/2011 |
| (Continued) | | |

OTHER PUBLICATIONS

International Search Report and Written Opinion—PCT/US2021/025432—ISA/EPO—dated Jul. 12, 2021.

*Primary Examiner* — Bob A Phunkulh
(74) *Attorney, Agent, or Firm* — Guang Yu Zhang; Norton Rose Fulbright US LLP

(57) ABSTRACT

Techniques for peak-to-average power ratio (PAPR) reduction are described. Wireless devices may provide signaling with respect to one or more PAPR shaping resources. For example, a wireless device may provide signaling of PAPR shaping capability information. PAPR shaping capability information may include information regarding one or more PAPR shaping resources the wireless device has a capability to implement. Additionally or alternatively, a wireless device may provide signaling of PAPR shaping information. PAPR shaping information may include information regarding shaping the signal by a wireless device prior to transmission in a communication link by implementing one or more PAPR shaping resources. Other aspects and features are also claimed and described.

26 Claims, 14 Drawing Sheets

(56) References Cited

U.S. PATENT DOCUMENTS

| | | | |
|---|---|---|---|
| 2007/0004465 A1 | 1/2007 | Papasakellariou et al. | |
| 2007/0081604 A1* | 4/2007 | Khan | H04L 25/03828 375/261 |
| 2008/0075184 A1 | 3/2008 | Muharemovic et al. | |
| 2008/0075191 A1 | 3/2008 | Haartsen | |
| 2008/0187072 A1 | 8/2008 | Schell et al. | |
| 2011/0207493 A1* | 8/2011 | Taoka | H04L 27/0008 455/509 |
| 2015/0200797 A1* | 7/2015 | McCallister | H04L 27/2623 370/329 |
| 2015/0280944 A1* | 10/2015 | Li | H04L 25/0384 375/295 |
| 2016/0330265 A1* | 11/2016 | Abdoli | H04L 27/2614 |
| 2017/0331663 A1* | 11/2017 | Moradi | H04L 27/3494 |
| 2018/0198668 A1 | 7/2018 | Kim et al. | |
| 2018/0324005 A1 | 11/2018 | Kim et al. | |
| 2018/0337811 A1 | 11/2018 | Ezri et al. | |
| 2019/0018098 A1 | 1/2019 | Schmitt et al. | |
| 2019/0020522 A1 | 1/2019 | Sun et al. | |
| 2019/0052486 A1* | 2/2019 | Kuchi | H04L 27/2644 |
| 2019/0182307 A1 | 6/2019 | Abdoli et al. | |
| 2020/0112467 A1* | 4/2020 | Shen | H04L 27/2621 |
| 2020/0204421 A1 | 6/2020 | Levinbook et al. | |
| 2020/0214083 A1* | 7/2020 | Sengupta | H04L 27/2613 |
| 2020/0259693 A1* | 8/2020 | Baldemair | H04L 5/0048 |
| 2021/0344545 A1 | 11/2021 | Sridharan | |
| 2023/0009137 A1 | 1/2023 | Sridharan | |

FOREIGN PATENT DOCUMENTS

| | | |
|---|---|---|
| CN | 108476194 A | 8/2018 |
| EP | 2424182 A1 | 2/2012 |
| EP | 3193481 A1 | 7/2017 |
| EP | 3573272 A1 | 11/2019 |
| WO | WO-2007092945 A2 | 8/2007 |
| WO | WO-2018089116 A1 | 5/2018 |
| WO | WO-2019042532 A1 | 3/2019 |

* cited by examiner

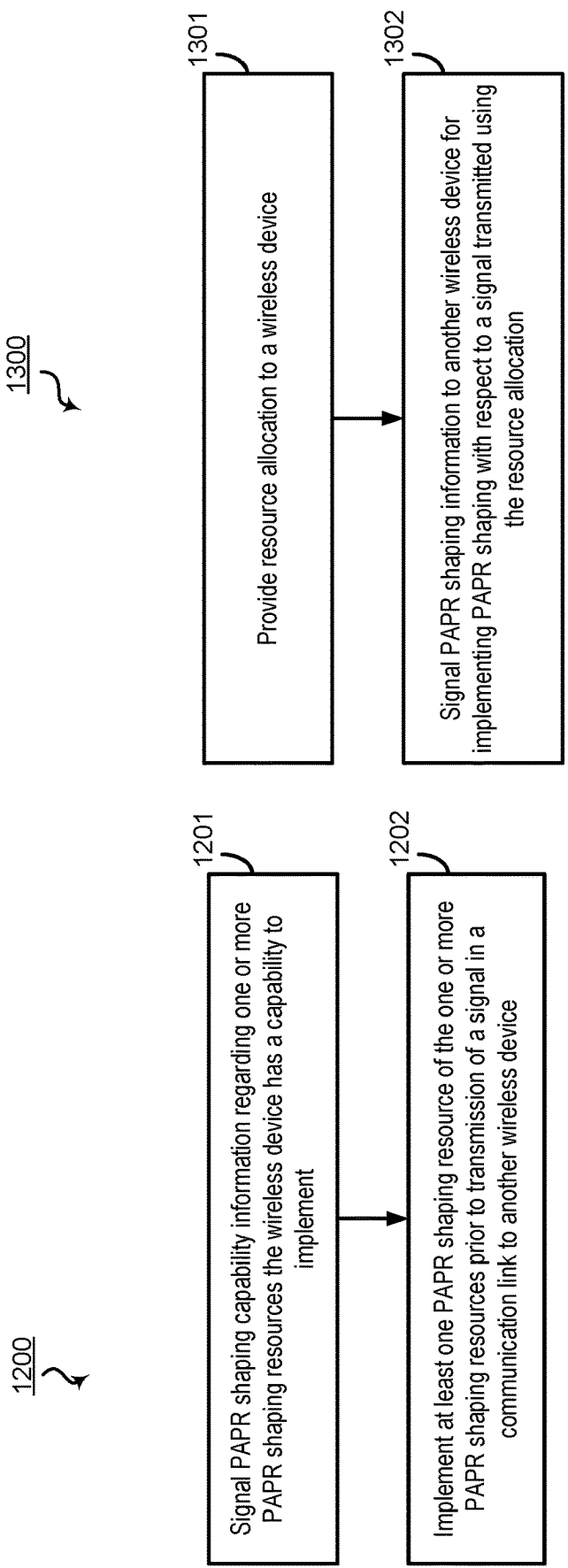

PEAK-TO-AVERAGE POWER RATIO (PAPR) REDUCTION TECHNIQUES

CROSS-REFERENCE TO RELATED APPLICATIONS

The present application is claims the benefit of U.S. Provisional Patent Application No. 63/019,086, entitled "Peak-To-Average Power Ratio (PAPR) Reduction Techniques," filed May 1, 2020, the disclosure of which is hereby incorporated by reference herein in its entirety as if fully set forth below and for all applicable purposes.

TECHNICAL FIELD

Aspects of the present disclosure relate generally to wireless communication systems, and more particularly, to techniques for peak-to-average power ratio (PAPR) reduction. Certain embodiments of the technology discussed below can enable and provide signaling with respect to one or more PAPR shaping resources, such as to provide signaling of PAPR shaping capability information and/or PAPR shaping resource implementation information.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

Signal distortion caused by processing of signals for transmission, such as by signal amplification provided by a power amplifier (PA), may also degrade performance on both the downlink and uplink. For example, some signal waveforms suffer from large peak-to-average power ratio (PAPR) which can result in high peaks causing a PA to operate in the nonlinear region. PA operation in the nonlinear region leads to signal distortion and spectral spreading of the signal.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. A method may include providing, by a first wireless device, resource allocation to a second wireless device. A method may also include signaling, by the first wireless device, peak to average power ratio (PAPR) shaping information to the second wireless device for implementing PAPR shaping with respect to a signal transmitted using the resource allocation. In some aspects of the disclosure the PAPR shaping information may include information regarding shaping the signal by the second wireless device prior to transmission in a communication link.

In an additional aspect of the disclosure, an apparatus configured for wireless communication is provided. An apparatus may include means for providing, by a first wireless device, resource allocation to a second wireless device. An apparatus may also include means for signaling, by the first wireless device, PAPR shaping information to the second wireless device for implementing PAPR shaping with respect to a signal transmitted using the resource allocation. In some aspects of the disclosure the PAPR shaping information includes information regarding shaping the signal by the second wireless device prior to transmission in a communication link.

In an additional aspect of the disclosure, a non-transitory computer-readable medium having program code recorded thereon for wireless communication is provided. Program code may include code to provide, by a first wireless device, resource allocation to a second wireless device. Program code may also include program code to signal, by the first wireless device, PAPR shaping information to the second wireless device for implementing PAPR shaping with respect to a signal transmitted using the resource allocation. In some aspects of the disclosure the PAPR shaping information includes information regarding shaping the signal by the second wireless device prior to transmission in a communication link.

In an additional aspect of the disclosure, an apparatus configured for wireless communication is provided. The apparatus includes at least one processor, and a memory coupled to the processor. A processor may be configured to provide, by a first wireless device, resource allocation to a second wireless device. A processor may also be configured to signal, by the first wireless device, PAPR shaping information to the second wireless device for implementing PAPR shaping with respect to a signal transmitted using the resource allocation. In some aspects of the disclosure the PAPR shaping information includes information regarding shaping the signal by the second wireless device prior to transmission in a communication link.

In accordance with aspects of the disclosure, the foregoing systems, methods, and apparatuses may be implemented in combination with one or more additional features, such as the following features whether alone or in combination. For example, the above systems, methods, and apparatuses may include the PAPR shaping information including information regarding one or more PAPR shaping resources for PAPR shaping and PAPR shaping implementation information. The above systems, methods, and apparatuses may include the first wireless device being a base station, the second wireless device being a user equipment (UE), the resource allocation being an uplink resource allocation, and the communication link being the uplink. The above systems, methods, and apparatuses may include the PAPR shaping information including information regarding expanded bandwidth available for shaping the signal prior to transmission in the communication link. The above systems, methods, and apparatuses may include the PAPR shaping information including information regarding a length of cyclic affix (CA) configured for PAPR shaping added by the second wireless device when processing the signal for transmission in the communication link, wherein the length of the CA corresponds to the expanded bandwidth. The above systems, methods, and apparatuses may include the CA including a cyclic prefix (CP), a cyclic suffix (CS), or a combination thereof. The above systems, methods, and apparatuses may include the information regarding the length of the CA including a number frequency resources of the expanded bandwidth. The above systems, methods, and apparatuses may include the information regarding the length of the CA including a size of the expanded bandwidth relative to the resource allocation. The above systems, methods, and apparatuses may include the PAPR shaping information including information regarding a bandwidth extension table from which the expanded bandwidth is determined. The above systems, methods, and apparatuses may include signaling the PAPR shaping information including using radio resource control (RRC) or media access control (MAC) control element (CE) signaling to provide information regarding the expanded bandwidth. The above systems, methods, and apparatuses may include signaling the PAPR shaping information including using downlink control information (DCI) signaling to dynamically provide information regarding the expanded bandwidth. The above systems, methods, and apparatuses may include the DCI signaling including both the resource allocation and the information regarding the expanded bandwidth. The above systems, methods, and apparatuses may include the PAPR shaping information including information regarding pulse-shaping filtering for shaping the signal prior to transmission in the communication link. The above systems, methods, and apparatuses may include the PAPR shaping information including information regarding whether pulse-shaping filtering is to be implemented by the second wireless device for a signal transmitted in the communication link. The above systems, methods, and apparatuses may include the PAPR shaping information including information regarding a pulse-shaping filter to be used by the second wireless device. The above systems, methods, and apparatuses may include signaling the PAPR shaping information including using RRC or MAC CE signaling to provide information regarding the pulse-shaping filtering. The above systems, methods, and apparatuses may include signaling the PAPR shaping information including using DCI signaling to dynamically provide information regarding the pulse-shaping filtering. The above systems, methods, and apparatuses may include the DCI signaling including both the resource allocation and the information regarding the pulse-shaping filtering. The above systems, methods, and apparatuses may include signaling demodulation reference signal (DMRS) information for a DMRS transmitted by the second wireless device in association with the transmission in the communication link, wherein the DMRS information includes information regarding whether a pulse-shaping filter is to be used by the second wireless device with respect to the DMRS transmitted by the second wireless device.

In one aspect of the disclosure, a method of wireless communication is provided. A method may include signaling, by a first wireless device to a second wireless device in communication with the first wireless device, PAPR shaping capability information regarding one or more PAPR shaping resources the first wireless device has a capability to implement. A method may also include implementing, by the first wireless device, at least one PAPR shaping resource of the one or more PAPR shaping resources prior to transmission of a signal in a communication link to the second wireless device.

In an additional aspect of the disclosure, an apparatus configured for wireless communication is provided. An apparatus may include means for signaling, by a first wireless device to a second wireless device in communication with the first wireless device, PAPR shaping capability information regarding one or more PAPR shaping resources the first wireless device has a capability to implement. An apparatus may also include means for implementing, by the first wireless device, at least one PAPR shaping resource of the one or more PAPR shaping resources prior to transmission of a signal in a communication link to the second wireless device.

In an additional aspect of the disclosure, a non-transitory computer-readable medium having program code recorded thereon for wireless communication is provided. Program code may include code to signal, by a first wireless device to a second wireless device in communication with the first wireless device, PAPR shaping capability information regarding one or more PAPR shaping resources the first wireless device has a capability to implement. Program code may also include code to implement, by the first wireless device, at least one PAPR shaping resource of the one or more PAPR shaping resources prior to transmission of a signal in a communication link to the second wireless device.

In an additional aspect of the disclosure, an apparatus configured for wireless communication is provided. The apparatus includes at least one processor, and a memory coupled to the processor. A processor may be configured to signal, by a first wireless device to a second wireless device in communication with the first wireless device, PAPR shaping capability information regarding one or more PAPR shaping resources the first wireless device has a capability to implement. A processor may also be configured to implement, by the first wireless device, at least one PAPR shaping resource of the one or more PAPR shaping resources prior to transmission of a signal in a communication link to the second wireless device.

In accordance with aspects of the disclosure, the foregoing systems, methods, and apparatuses may be implemented in combination with one or more additional features, such as the following features whether alone or in combination. For example, the above systems, methods, and apparatuses may include the first wireless device including a UE, the second wireless device comprises a base station, and the communication link comprises an uplink. The above systems, methods, and apparatuses may include the one or more PAPR shaping resources the first wireless device has a capability to implement including expanded bandwidth available for shaping the signal prior to transmission in the uplink. The above systems, methods, and apparatuses may include the one or more PAPR shaping resources the first wireless device has a capability to implement including pulse-shaping filtering for shaping the signal prior to transmission in the uplink. The above systems, methods, and apparatuses may include the PAPR shaping capability information including information regarding a pulse-shaping filter implemented by the first wireless device. The above systems, methods, and apparatuses may include signaling the PAPR shaping capability information including providing the PAPR shaping capability information in an initial call setup procedure implemented with respect to the communication link between the first wireless device and the second wireless device. The above systems, methods, and apparatuses may include receiving, by the first wireless device from the second wireless device, PAPR shaping information, wherein the PAPR shaping information is responsive to the PAPR shaping capability information signaled by the first wireless device, and wherein the implementing at least one PAPR shaping resource is in accordance with the PAPR shaping information received from the second wireless device. The above systems, methods, and apparatuses may include receiving, by the first wireless device from the second wireless device, DMRS information, wherein DMRS information is responsive to the PAPR shaping capability information signaled by the first wireless device, and wherein the DMRS information includes information regarding whether a pulse-shaping filter is to be used by the first wireless device with respect to the DMRS transmitted by the first wireless device.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 12 and 13 show flow diagrams of operation by wireless devices facilitating PAPR reduction according to some embodiments of the present disclosure.

DETAILED DESCRIPTION

Figure 1:
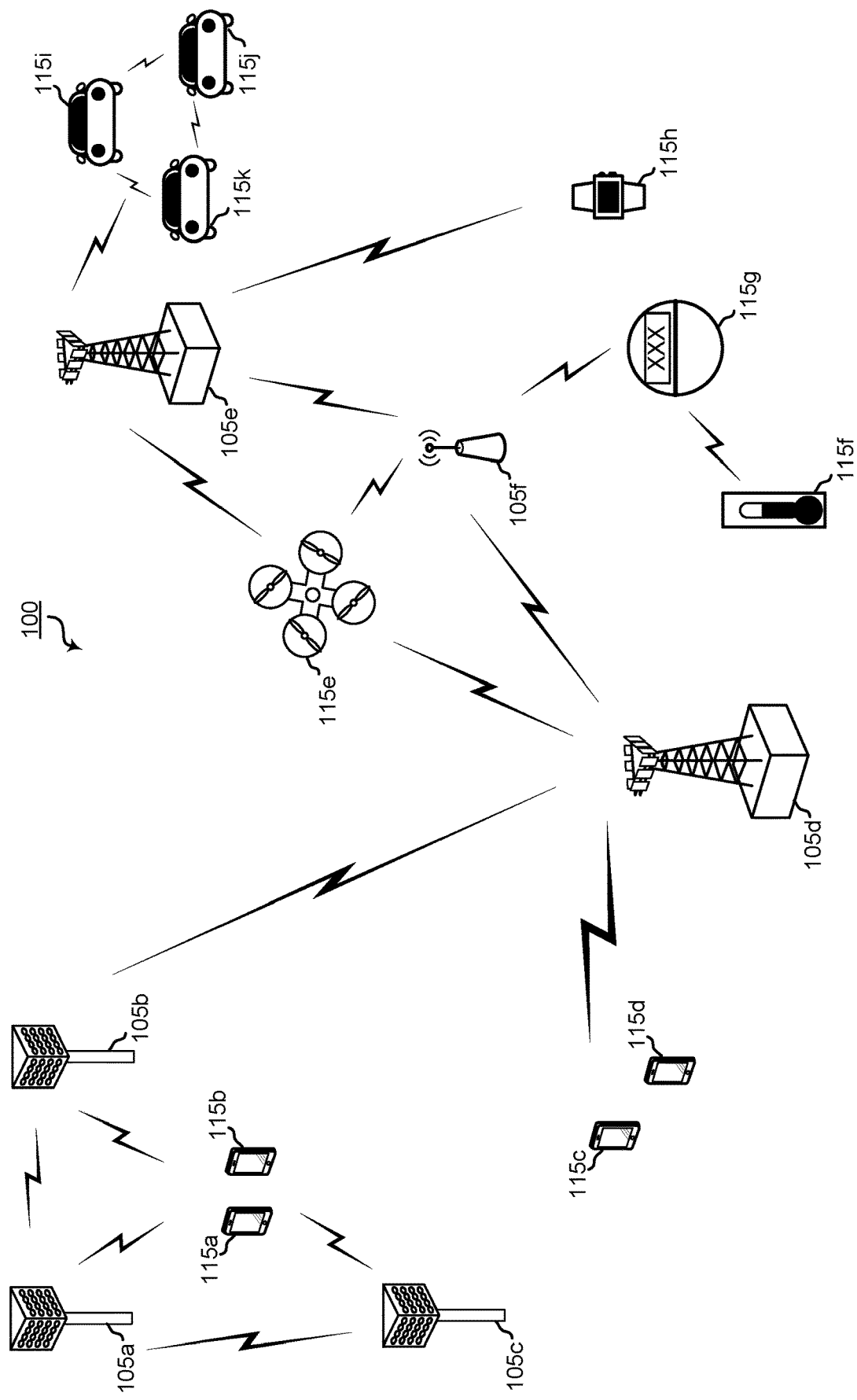
FIG. 1 is a block diagram illustrating details of a wireless communication system according to some embodiments of the present disclosure.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-orthogonal frequency division multiplex (OFDM) and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km2), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the $3^{rd}$ Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-

115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
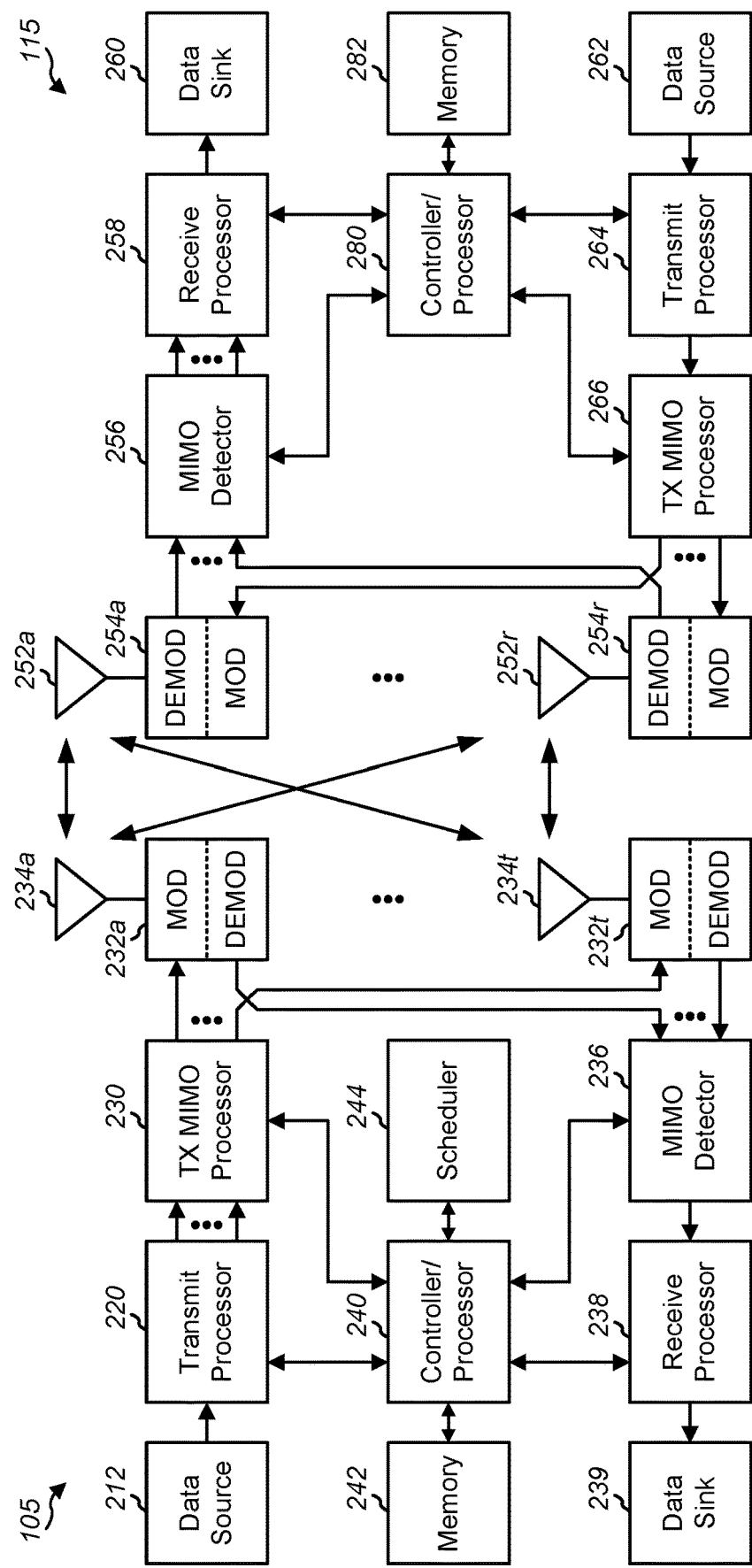
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232*a* through 232*t*. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, the antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 11A, 11B, 12, and 13, and/or other processes for the techniques described herein. Memories 242 and 282 may store data and program codes for base station 105 and UE 115, respectively. Scheduler 244 may schedule UEs for data transmission on the downlink and/or uplink.

Power amplifiers (PAs), such as used by wireless devices (e.g., base stations 105, UEs 115, etc. of wireless network 100), have a non-linear behavior if operated at very high input power. This non-linearity results in in-band and out-of-band distortion of the signal, and degraded error vector magnitude (EVM) at the receivers. To avoid the non-linearity, the PA may be operated at a mean input power that is several dB lower than the saturation point.

Transmit power and PA efficiency are both impacted at a wireless device transmitting a signal due to peak-to-average power ratio (PAPR) characteristics of the waveforms employed. The PAPR of the signal waveform, as may be determined from the peak amplitude squared (i.e., the peak power) divided by the RMS value squared (i.e., the average power), is correlated to the quality of the waveform and the wireless device emissions. If a signal has a PAPR of X dB, an input backoff (IBO) of X dB may be used to avoid the non-linearity even at the peak of the input signal.

OFDM signals are known to suffer from significant PAPR that grows rapidly with the size of the OFDM block. An OFDM waveform, for example, suffers from relatively large PAPR (e.g., PAPR in the range of 10 dB). 5G NR aims for higher data-rates than LTE, and the OFDM block-size is larger, further increasing the PAPR. Since OFDM signals have a high PAPR, these signals could be clipped in the transmitter PA, because of its limited dynamic range or non-linearity. Moreover, if a PA is not operated in its linear region, the signal peaks may leak into the non-linear region of the PA causing signal distortion. This signal distortion may introduce inter-modulation among the sub-carriers and out-of-band emission.

Accordingly, PA back-off may be utilized to prevent performance degradation and inter-modulation products leaking into adjacent channels. Such PA back-off, however, may come at the cost of the degraded PA efficiency. Even for low modulation coding scheme (MCS) transmissions that are not particularly demanding with respect to signal quality (e.g., do not need high EVM), PA efficiency and transmit power are both limited by the resulting PAPR of the signal waveform. Power available for transmission is further reduced due to the PAPR characteristics of the waveform and the in-band and out of band emissions, adjacent channel leakage power ratio (ACLR) requirements, etc.

The existing PAPR reduction techniques are data-dependent and computationally expensive, often making them undesirable for a real-time implementation. As a result, clipping and filtering (CF) is most commonly used in the industry for providing PAPR reduction. However, CF results in in-band distortion and is not guaranteed to converge to a desirable solution.

Discrete Fourier transform (DFT) spread OFDM (DFT-s-OFDM) is a single carrier waveform that has been included in the 3GPP standard for uplink transmission due to its low PAPR. For example, OFDM is a sum of sine waves (i.e., no pulses), where every y(n) is a sum of N terms with equal contribution, which leads to higher PAPR. In contrast, DFT-s-OFDM has sinc pulses that decay, as described below, with fewer dominant terms in each y(n) which leads to a reduction in PAPR. For QPSK modulation, for example, DFT-s-OFDM can reduce the PAPR by 3 to 4 dB.

Figure 3:
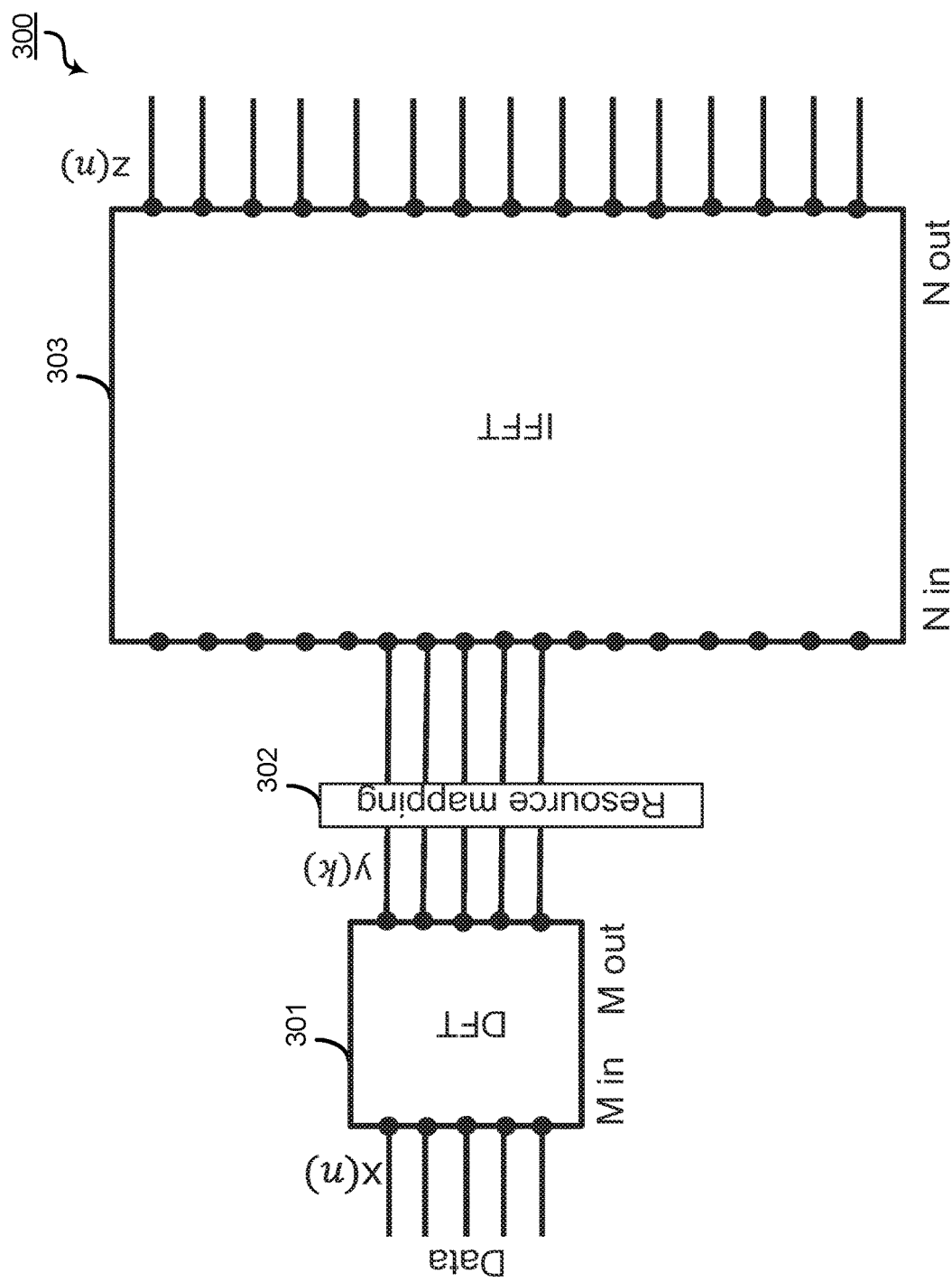
FIG. 3 is an example of a Discrete Fourier transform (DFT) spread orthogonal frequency division multiplex (OFDM) (DFT-s-OFDM) generation circuit.

FIG. 3 shows DFT-s-OFDM waveform generation circuit 300. As shown in FIG. 3, in providing a DFT-s-OFDM waveform, the data signal (x(n)) to be transmitted is initially processed via DFT block 301 to provide a frequency domain signal (y(k), where y=DFT(x)=DMx). The DFT output is then mapped to frequency domain resources by resource mapping block 302. Finally, a time-domain signal (z(n), where z=IDFT(y)) is obtained by taking the N-point inverse Fourier transform of the frequency-domain data via inverse fast Fourier transform (IFFT) block 303. The foregoing operation provides the DFT-s-OFDM:

$$y=DM((:,0)x(0)+DM((:,1)x(1)+DM((:,2)x(2)+ \ldots +DM((:,M-1)x(M-1) \quad (1)$$

Each column acts as a phase ramp (e.g., phase ramps DM((:,0), DM((:,1), etc.) applied on top of an input modulation symbol. As can be seen in equation 1 above, y is a sum of M terms, each with a unique phase ramp. Each of these M terms acts on a sinc kernel or pulse of an input modulation symbol, wherein the kernel/pulse width is determined by the number of excited subcarriers.

Figure 4:
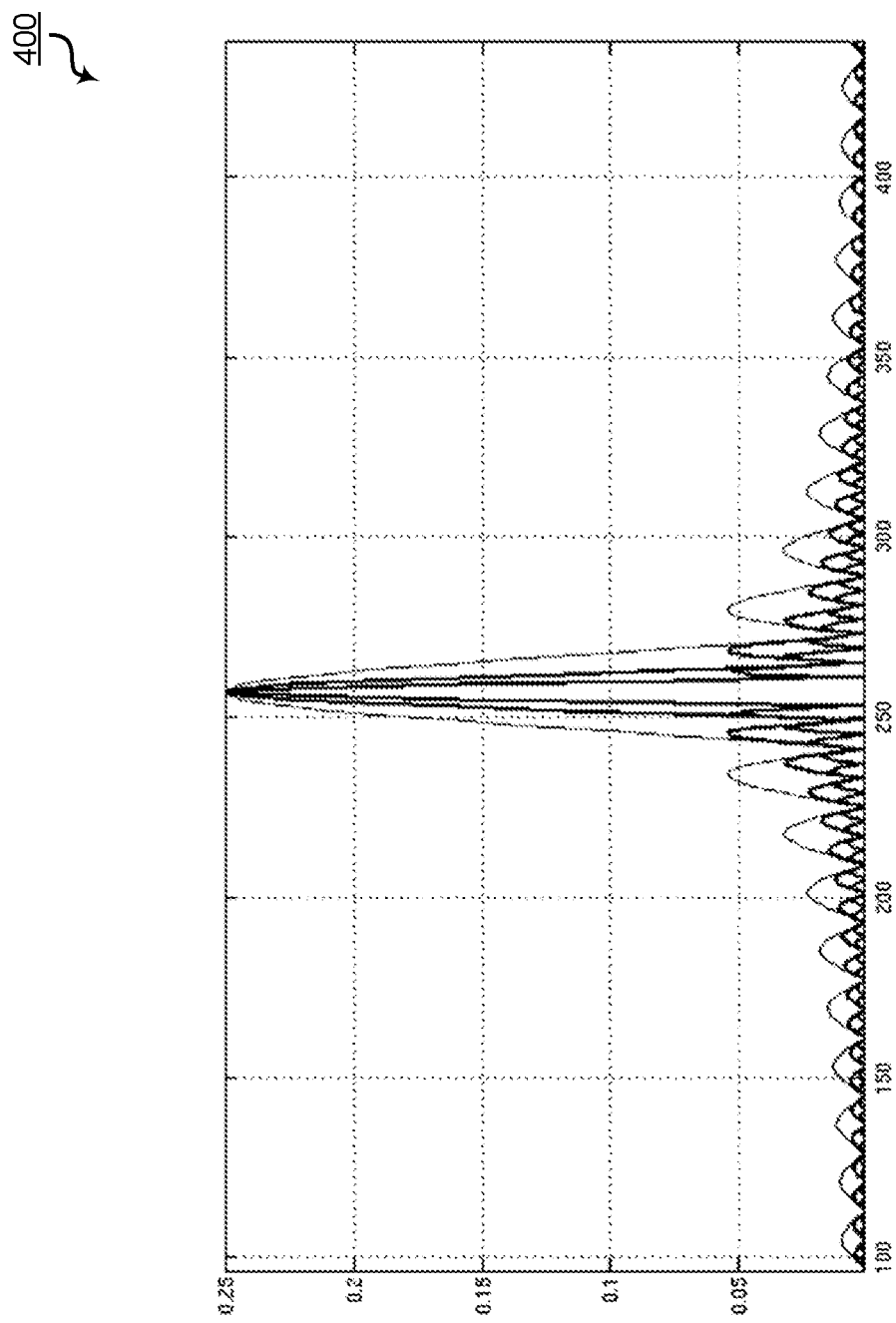
FIG. 4 shows an example of a kernel or pulse shape of a DFT-s-OFDM waveform as may be provided by the DFT-s-OFDM generation circuit of FIG. 3.
Figure 5:
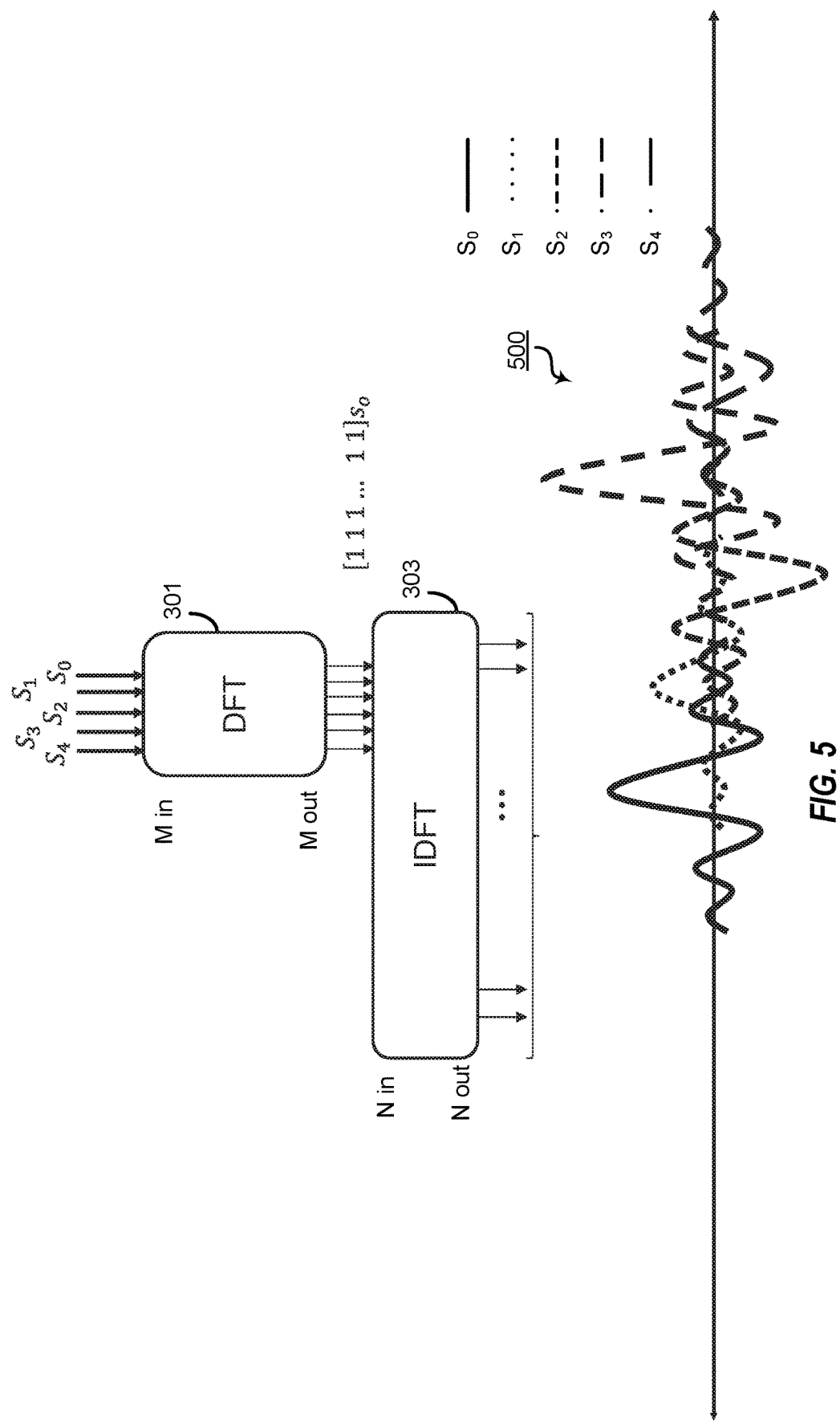
FIG. 5 shows an example of a final DFT-s-OFDM waveform as may be provided by the DFT-s-OFDM generation circuit of FIG. 3.

An example of the kernel or pulse shape of a DFT-s-OFDM waveform is shown in the graph of FIG. 4. Graph 400 of FIG. 4 illustrates the kernel or pulse in (M,N) DFT-s-OFDM, with M=32, 64 or 128 and N=512. Columns of DM shift this kernel in time domain and scale it as per the input modulation symbol. The final DFT-s-OFDM waveform is a linear combination of shifted (due to phase ramp as defined by columns of the DFT matrix) and scaled copies of this kernel. An example of such a final DFT-s-OFDM waveform is shown in FIG. 5 as waveform 500.

Techniques for PAPR reduction in accordance with aspects of the present disclosure may lower the PAPR of DFT-s-OFDM waveforms. Embodiments disclosed herein may, for example, reduce the width of kernels/pulses of DFT-s-OFDM waveforms, shape the kernels/pulses to suppress sidelobes, etc. and provide reduced PAPR DFT-s-OFDM waveforms (e.g., reduced PAPR as compared to OFDM and conventional DFT-s-OFDM waveforms).

Embodiments of the present disclosure provide peak to average power ratio shaping for PAPR reduction using one or more PAPR shaping resources. For example, in accordance with some embodiments, the one or more PAPR shaping resources may include expanded bandwidth available for shaping the signal prior to transmission. As described further below, expanded bandwidth may be used to add a cyclic affix (CA), such as may comprise a cyclic prefix (CP), cyclic suffix (CS), etc., and combinations thereof, configured for PAPR shaping a signal for transmission. In accordance with some aspects of the disclosure, CAs provided in expanded bandwidth of embodiments reduces the width of the kernels/pulses of a DFT-s-OFDM waveform, enabling and providing PAPR reduction. Additionally or alternatively, in accordance with some embodiments, the one or more PAPR shaping resources may include pulse-shaping filtering for shaping the signal prior to transmission. As described further below, pulse-shaping filtering may be used in which a pulse-shaping filter with a fast-decaying time-domain tail is applied to a signal for transmission. In accordance with some aspects of the disclosure, pulse-shaping filtering of embodiments shapes the kernels/pulses and suppresses sidelobes of a DFT-s-OFDM waveform, enabling and providing PAPR reduction. Such expanded bandwidth and/or pulse-shaping filtering may, for example, be implemented when processing a signal for transmission to shape the signal to reduce PAPR in accordance with concepts of the present disclosure.

Figure 6:
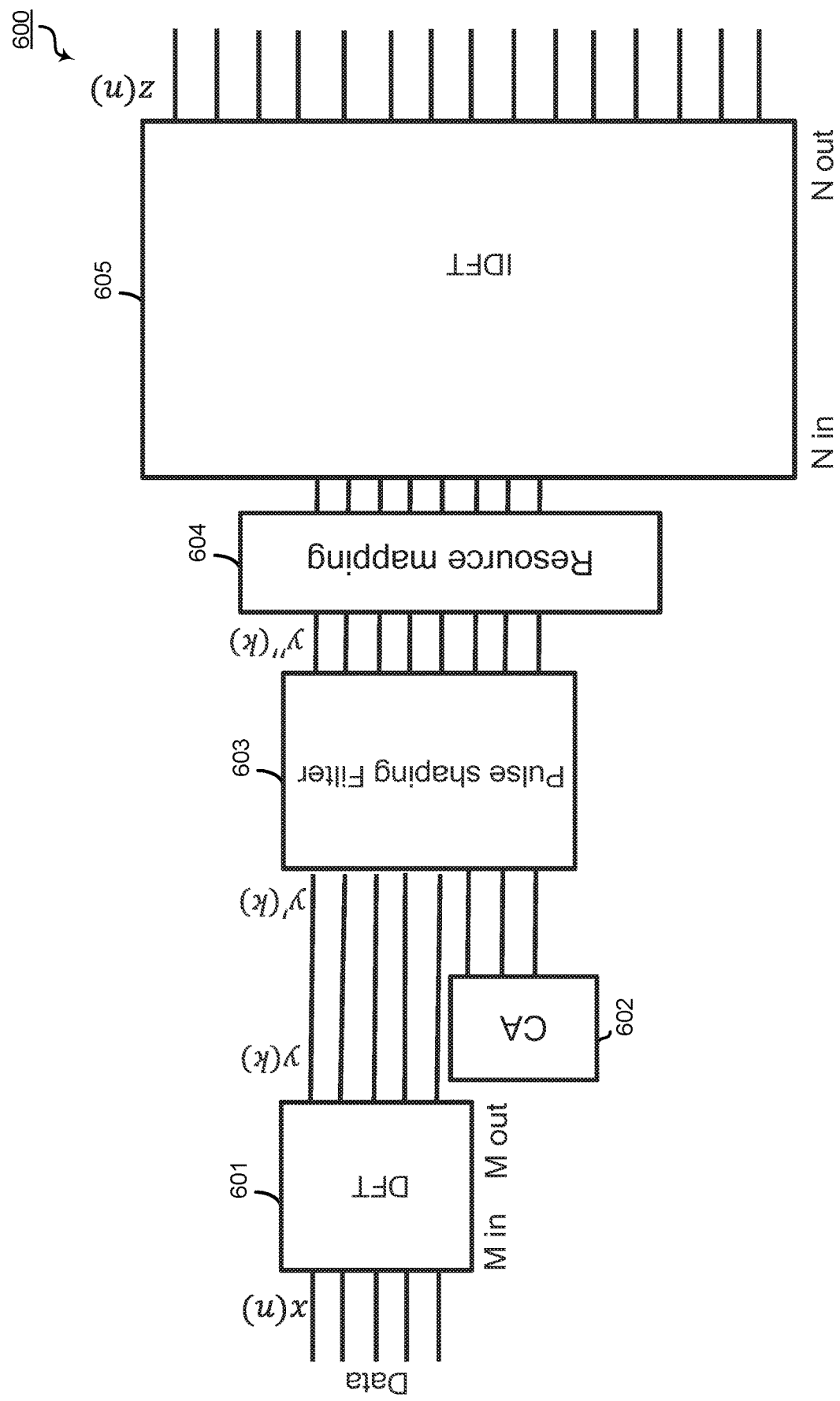
FIG. 6 is a peak-to-average power ratio (PAPR) reduction circuit configured according to some embodiments of the present disclosure.

FIG. 6 shows PAPR reduction circuit 600 configured according to some aspects of the present disclosure. Similar to DFT-s-OFDM waveform generation circuit 300, PAPR reduction circuit 600 includes a DFT block (shown as DFT block 601), a resource mapping block (shown as resource mapping block 604), and an inverse DFT block (shown as IDFT block 605) operable to provide a DFT-s-OFDM waveform (z(n)) for transmission of an input data signal (x(n)). DFT block 601 may, for example, comprise digital signal processing logic executed by one or more processors (e.g., controller/processor 240 and/or transmit processor 220 of base station 105, controller/processor 280 and/or transmit processor 264 of UE 115, etc.) to generate a frequency domain signal (y(k)) from a signal (x(n)) input to the DFT block. Resource mapping block 604 may comprise logic executed by one or more processors (e.g., controller/processor 240 and/or transmit processor 220 of base station 105, controller/processor 280 and/or transmit processor 264 of UE 115, etc.) to map (e.g., using localized mapping where the allocation is contiguous in frequency, using distributed mapping where the allocation is evenly spaced in the frequency domain, etc.) the frequency-domain precoding to frequency subcarriers prior to inverse transforming by IDFT block 605. In operation according to some aspects, resource mapping block 604 determines how the output of pulse shaping is mapped as input to IDFT block 605. IDFT block 605 may comprise digital signal processing logic executed by one or more processors (e.g., controller/processor 240 and/or transmit processor 220 of base station 105, controller/processor 280 and/or transmit processor 264 of UE 115, etc.) to generate a time domain signal (z(n)) from a frequency domain signal (y" (n)) input to the IDFT block.

PAPR reduction circuit 600 of the embodiment illustrated in FIG. 6 is configured to utilize one or more PAPR shaping resources for shaping a signal prior to transmission. For example, PAPR reduction circuit 600 includes CA block 602 and phase-shaping filter block 603, either or both of which may be implemented for processing a signal for PAPR reduction. CA block 602 may, for example, comprise logic executed by one or more processors (e.g., controller/processor 240 and/or transmit processor 220 of base station 105, controller/processor 280 and/or transmit processor 264 of UE 115, etc.) to determine expanded bandwidth available for use as PAPR shaping resources, to determine one or more attributes of CAs (e.g., length, number, etc.) for adding to signals being processed by PAPR reduction circuit 600, to add CAs to signals being processed by PAPR reduction circuit 600, etc. Pulse-shaping filter block 603 may comprise digital signal processing logic executed by one or more processors (e.g., controller/processor 240 and/or transmit processor 220 of base station 105, controller/processor 280 and/or transmit processor 264 of UE 115, etc.) to apply pulse-shaping filtering to signals being processed by PAPR reduction circuit 600.

Figure 7:
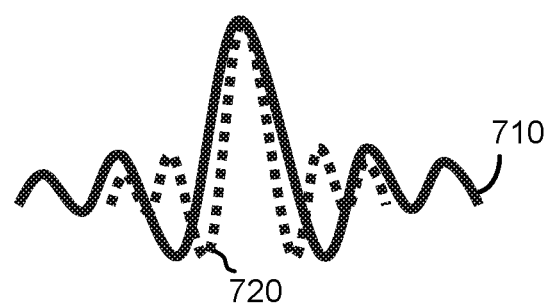
FIG. 7 shows a reduction in pulse width as may be provided according to some embodiments of the disclosure.

In accordance with aspects of the disclosure, the width of kernels/pulses in a DFT-s-OFDM signal are reduced by CA block 602 adding a CA to a signal being processed by PAPR reduction circuit 600. A reduction in pulse width as may be provided according to some aspects of the disclosure is illustrated in FIG. 7. In particular, waveform 710 illustrates a kernel/pulse of a DFT-s-OFDM waveform, such as may be generated by DFT-s-OFDM waveform generation circuit 300 of FIG. 3, and waveform 720 illustrates a kernel/pulse of a PAPR reduced DFT-s-OFDM waveform, such as may be generated by PAPR reduction circuit 600 of FIG. 6.

Figure 8:
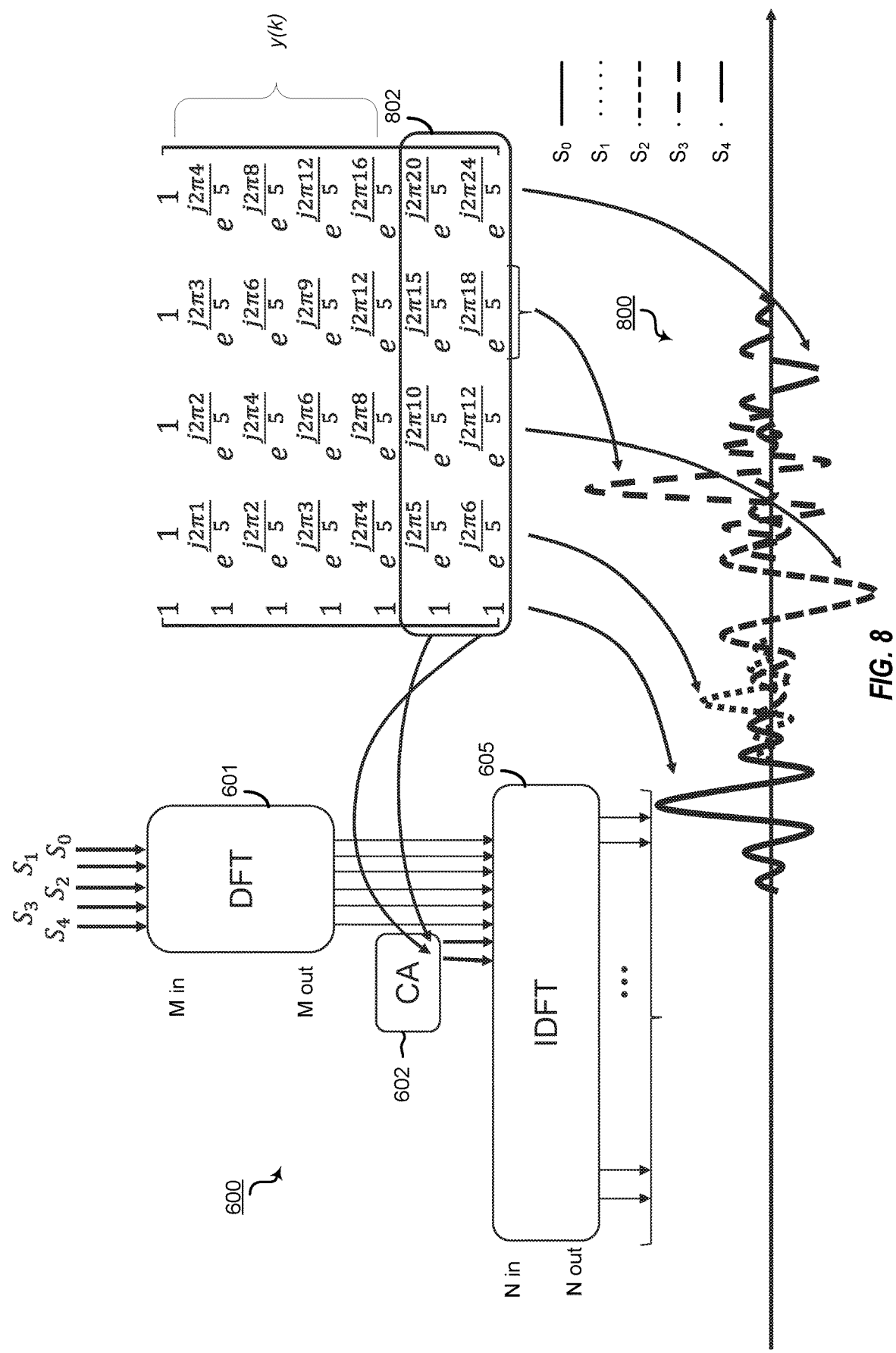
FIG. 8 shows a reduction in pulse widths provided by operation of a cyclic affix (CA) block according to some embodiments of the present disclosure.

FIG. 8 illustrates a reduction in pulse widths provided by operation of CA block 602 of embodiments. As shown in the example of FIG. 8, CA block 602 may use expanded bandwidth to add frequency domain CA 802 to a frequency domain signal (y(k)) being processed by PAPR reduction circuit 600. CA 802 may comprise K resources or tones within the expanded bandwidth (e.g., occupying some or all bandwidth of the expanded bandwidth) added to the M resources or tones of the frequency domain signal provided by DFT block 601, such that M+K resources or tones are used by IDFT block 605 to generate reduced PAPR DFT-s-OFDM waveform 800. The repeated values added by CA 802 of embodiments operate to preserve the ramp of peaks (e.g., peaks 811-814) while extending those peaks. Reduced PAPR DFT-s-OFDM waveform 800 provided by operation of PAPR reduction circuit 600 implementing CA block 602 to add CA 802 to the signal being process has reduced width pluses and reduced overlapping of the pulses.

Embodiments of the present disclosure may use one or more tones in addition to or in the alternative to the above described CA implemented using expanded bandwidth to generate reduced PAPR DFT-s-OFDM waveforms. For example, a set of additional tones (e.g., tones orthogonal to the data tones) may be used to shape the time domain signal. In one aspect of the disclosure, some or all of above described expanded bandwidth may be used to add one or more tones of a set of additional tones for generating a reduced PAPR DFT-s-OFDM waveform. The generated reduced PAPR DFT-s-OFDM waveform may, however, not preserve the ramp of peaks as described above with respect to embodiments implementing CA block 602.

Expanded bandwidth utilized according to some aspects of the disclosure may comprise carrier resources outside of carrier resources allocated for data transmission (e.g., carrier resources outside of those allocated for transmission of data signal x(n)), which may be enabled or otherwise available for use as PAPR shaping resources for shaping a signal to reduce PAPR. For example, expanded bandwidth may comprise carrier resources outside of an allocated grant for a wireless device, although in the bandwidth available for allocation (i.e., still in-band). Additionally or alternatively, expanded bandwidth utilized according to some aspects of the disclosure may comprise carrier resources, or some portion thereof, allocated for data transmission (e.g., carrier resources of those allocated for transmission of data signal x(n)). For example, pulse shaping (e.g., sidelobe suppression) implemented according to embodiments may enable and provide for the use of bandwidth within the allocated bandwidth as expanded bandwidth available as PAPR shaping resources. In accordance with some embodiments, a bandwidth extension table (BET) may be defined (e.g., specified in a communication standard to which operation of the wireless devices conforms) and provided to the wireless devices (e.g., when provisioned, when joining or accessing the wireless network, etc.) for use in identifying and utilizing expanded bandwidth for PAPR shaping. For example, a wireless device (e.g., base station 105, UE 115, etc.) may reference a BET (e.g., using one or more communication parameters, such as MCS, resource block (RB) allocation, etc.) to determine expanded bandwidth availability for use with respect to a particular signal.

Figure 9:
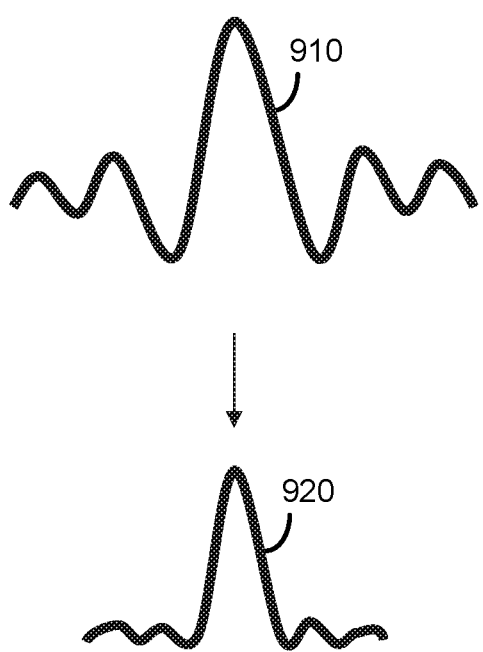
FIG. 9 shows pulse shaping and sidelobe suppression provided according to some embodiments of the present disclosure.

In accordance with aspects of the disclosure, the pulses are shaped and/or sidelobes suppressed for a DFT-s-OFDM waveform by pulse shaping filter block 603 applying pulse-shaping filtering to a signal being processed by PAPR reduction circuit 600. Pulse shaping and sidelobe suppression as may be provided according to some aspects of the disclosure is illustrated in FIG. 9. In particular, waveform 910 illustrates a kernel/pulse of a DFT-s-OFDM waveform, such as may be generated by DFT-s-OFDM waveform generation circuit 300 of FIG. 3, and waveform 920 illustrates a kernel/pulse of a PAPR reduced DFT-s-OFDM waveform, such as may be generated by PAPR reduction circuit 600 of FIG. 6.

Figure 10:
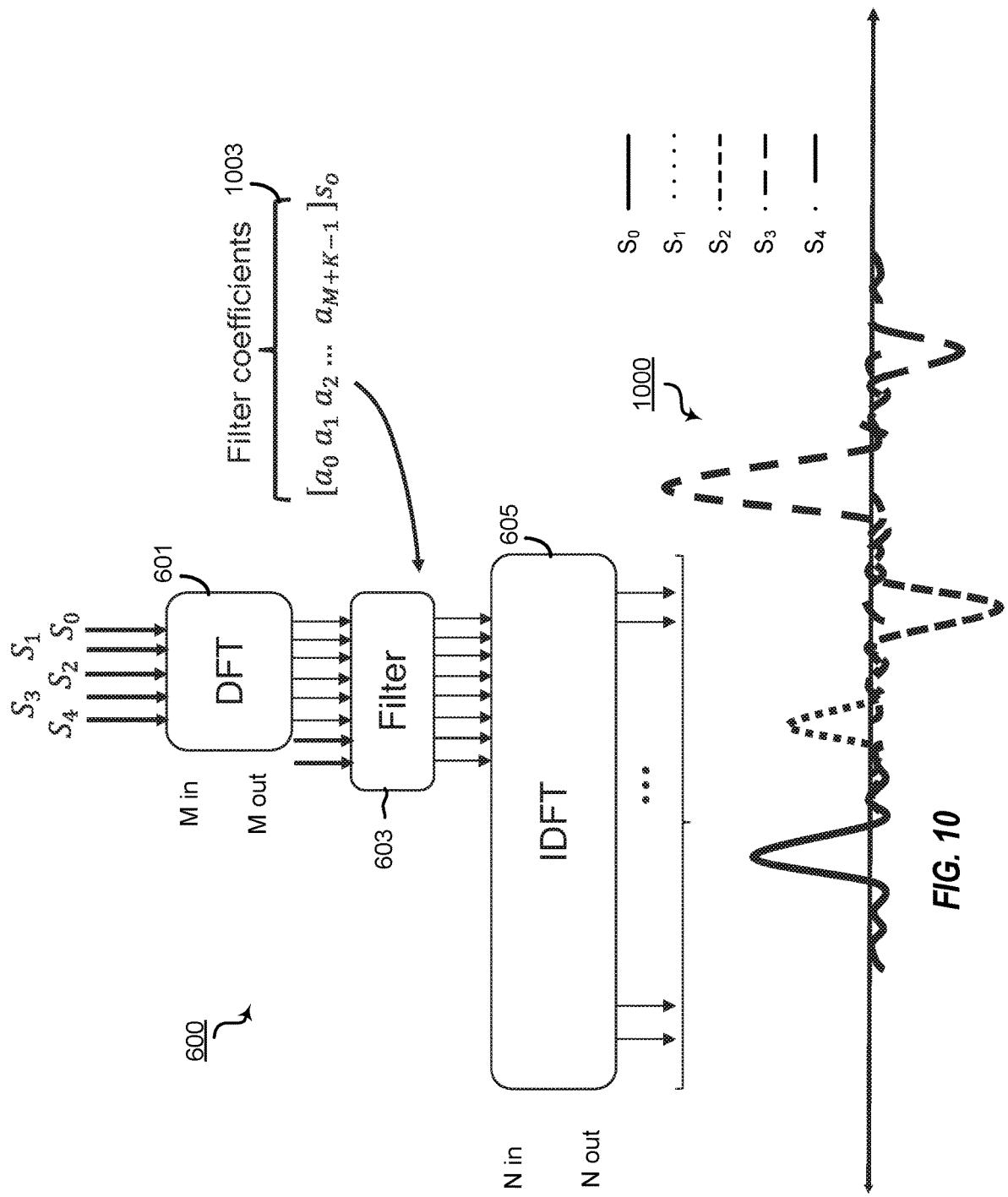
FIG. 10 shows pulse shaping provided by operation of a phase-shaping filter block of some embodiments of the present disclosure.

FIG. 10 illustrates pulse shaping provided by operation of phase-shaping filter block 603 of embodiments. As shown in the example of FIG. 10, phase-shaping filter block 603 may use filter coefficients 1003 configured for filtering operations to shape the frequency domain signal (y'(k)) being processed by PAPR reduction circuit 600, such as for sidelobe suppression, peak reduction, etc. In accordance with some aspects of the disclosure, filter coefficients 1003 configure pulse-shaping filter block 603 with a fast-decaying time-domain tail. For example, the filter coefficients of phase-shaping filter block 603 may be selected to correspond to the Hanning window, the Hamming window, a square-root-raised-cosign (SRRC) filter, etc. Pulse shaping using the Hanning window, Hamming window, or SRRC (e.g., multiplication of a frequency domain signal output by DFT block 601 filter coefficients 1003 corresponding to the Hanning window, Hamming window, or SRRC in the frequency domain) may, for example, provide pulse shaping to suppress sidelobes (e.g., as shown in FIG. 9). Reduced PAPR DFT-s-OFDM waveform 1000 provided by operation of PAPR reduction circuit 600 implementing pulse-shaping filter block 603 to filter the signal being process has reduced sidelobes and reduced overlapping of the pulses.

Referring again to FIG. 6, in operation of PAPR reduction circuit 600 implementing CA block 602 and pulse-shaping filter block 603, a pre-DFT signal x(n) (e.g., time domain data signal) may be transformed to post-DFT signal y(k) (e.g., frequency domain data signal) by operation of DFT block 601. CA augmented frequency domain data signal y'(k) may be constructed by operation of CA block 602 adding a CA to the post-DFT signal y(k) (e.g., frequency domain data signal) to provide a CA augmented frequency domain data signal y'(k). For example, if the length of the CA is c, and the length of x is m, y'(k) may be constructed as y'=[y(m−c+1:m), y(1:end)]. CA augmented frequency domain data signal y'(k) may be passed through pulse-shaping filter 603 (e.g., a filter with fast-decaying time-domain tail such as the Hanning window, the Hamming window, SRRC) to obtain a pulse-shaped frequency domain data signal y"(k). Reduced PAPR DFT-s-OFDM waveform z(n) may be generated by IDFT block 605 transforming the pulse-shaped frequency domain data signal y"(k) to the time domain. For example, reduced PAPR DFT-s-OFDM waveform z(n) may be obtained via z(n)=ifft(y"(n)). The extent to which the PAPR of reduced PAPR DFT-s-OFDM waveform z(n) of embodiments is reduced (e.g., lower than the DFT-s-OFDM waveform provide by DFT-s-OFDM waveform generation circuit 300) may correspond, at least in part, to the length of the CA. For example, in an example where the length of the CA is equal to the length of the data, PAPR reduction circuit 600 of embodiments may achieve approximately 2 dB PAPR for QPSK.

Figures 11A, 11B:
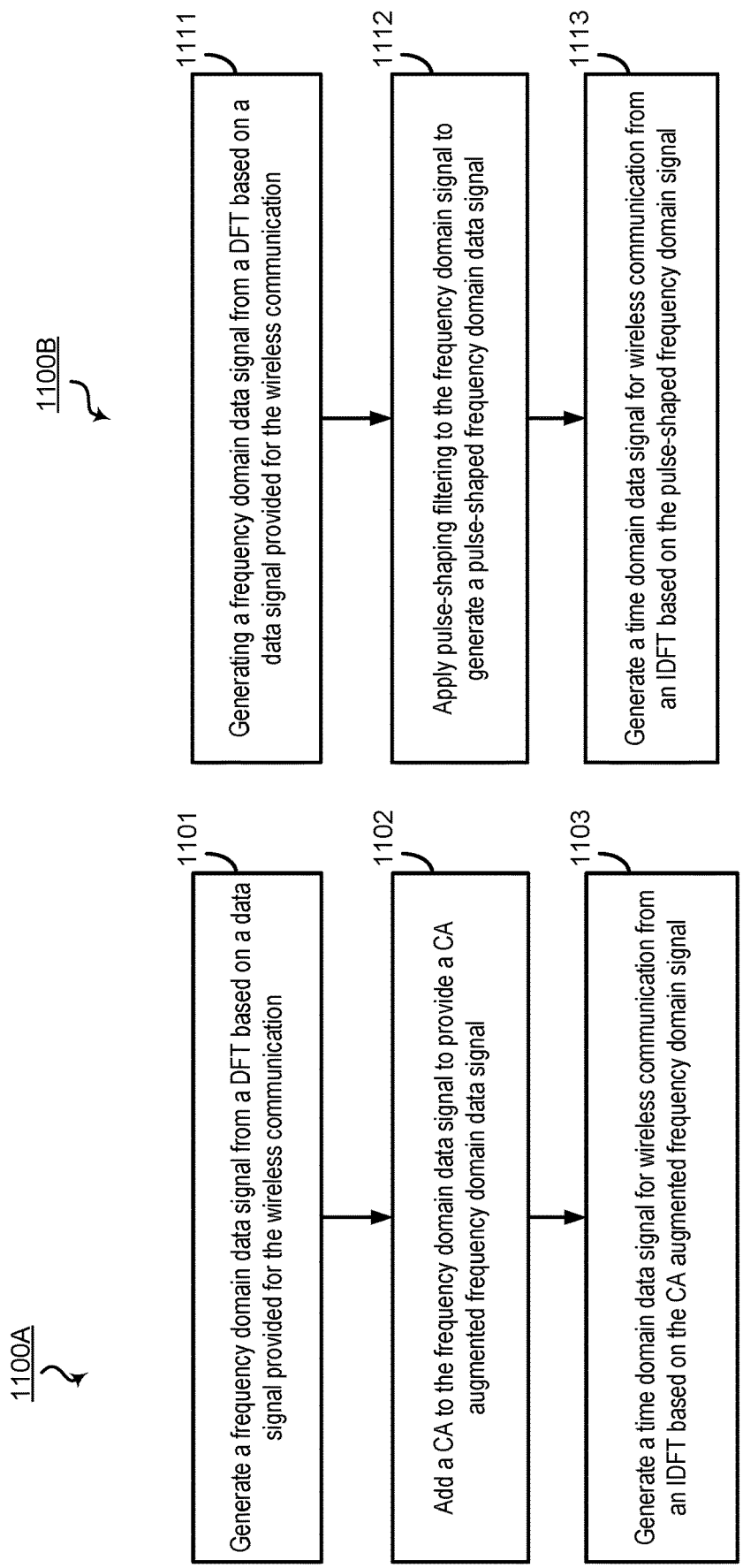
FIGS. 11A and 11B show flow diagrams of operation by wireless devices implementing PAPR reduction according to some embodiments of the present disclosure.

FIGS. 11A and 11B show flow diagrams of operation by a wireless device implementing PAPR reduction according to aspects of the present disclosure. The functions of flow 1100A of the example shown in FIG. 11A and of flow 1100B of the example shown in FIG. 11B may, for example, be performed by various wireless devices of wireless network 100 (e.g., one or more of base stations 105 and/or UEs 115) for providing reduced PAPR DFT-s-OFDM waveforms according to aspects of the present disclosure.

At block 1101 of example flow 1100A, a wireless device may generate a frequency domain data signal from a DFT based on a data signal provided for the wireless communication. For example, digital signal processing logic executed by one or more processors (e.g., controller/processor 240 and/or transmit processor 220 of base station 105, controller/processor 280 and/or transmit processor 264 of UE 115, etc.) implementing a DFT block may be utilized to generate a frequency domain signal (y(k)) from a signal (x(n)) being processed for transmission.

A CA may be added by the wireless device to the frequency domain data signal to provide a CA augmented frequency domain data signal at block 1102. The CA added to the frequency domain may, for example, be configured for PAPR shaping with respect to a reduced PAPR DFT-s-OFDM waveform generated based on the CA augmented frequency domain data signal. For example, logic executed by one or more processors (e.g., controller/processor 240 and/or transmit processor 220 of base station 105, controller/processor 280 and/or transmit processor 264 of UE 115, etc.) implementing a CA block may add a CA to a frequency domain signal (y(k)), or other signal derived from the frequency domain signal y(k), and provide a CA augmented frequency domain data signal (y'(k)). The aforementioned logic implementing a CA block may additionally operate to determine expanded bandwidth available for use as PAPR shaping resources, to determine one or more attributes of CAs (e.g., length, number, etc.) for adding to signals being processed for transmission, etc.

At block 1103, the wireless device may generate a time domain data signal for wireless communication from an IDFT based on the CA augmented frequency domain signal. For example, digital signal processing logic executed by one or more processors (e.g., controller/processor 240 and/or transmit processor 220 of base station 105, controller/processor 280 and/or transmit processor 264 of UE 115, etc.) implementing an IDFT block may generate a time domain signal (z(n)) from a CA augmented frequency domain data signal (y' (k)), or other signal derived from the frequency domain signal y(k), and provide a reduced PAPR waveform according to aspects of the present disclosure. The CA augmented frequency domain data signal (y' (k)), or other signal derived from the frequency domain signal y(k), may be mapped (e.g., by logic executed by one or more processors, such as controller/processor 240 and/or transmit processor 220 of base station 105, controller/processor 280 and/or transmit processor 264 of UE 115, etc., implementing a resource mapping block) to frequency subcarriers prior to the foregoing inverse transforming according to embodiments.

At block 1111 of example flow 1100B, a wireless device may generate a frequency domain data signal from a DFT based on a data signal provided for the wireless communication. For example, digital signal processing logic executed by one or more processors (e.g., controller/processor 240 and/or transmit processor 220 of base station 105, controller/processor 280 and/or transmit processor 264 of UE 115, etc.) implementing a DFT block may be utilized to generate a frequency domain signal (y(k)) from a signal (x(n)) being processed for transmission.

Pulse-shaping filtering may be applied by the wireless device to the frequency domain data signal to generate a pulse-shaped frequency domain data signal at block 1112. The pulse-shaping filtering may, for example, be configured for PAPR shaping with respect to a reduced PAPR DFT-s-OFDM waveform generated based on the pulse-shaped frequency domain data signal. For example, digital signal processing logic executed by one or more processors (e.g., controller/processor 240 and/or transmit processor 220 of base station 105, controller/processor 280 and/or transmit processor 264 of UE 115, etc.) implementing a pulse-shaping filter block may apply pulse-shaping filtering to a frequency domain signal (y(k)), or other signal derived from the frequency domain signal y(k), and provide a pulse-shaped frequency domain data signal y"(k).

At block 1113, the wireless device may generate a time domain data signal for wireless communication from an IDFT based on the pulse-shaped frequency domain signal. For example, digital signal processing logic executed by one or more processors (e.g., controller/processor 240 and/or transmit processor 220 of base station 105, controller/processor 280 and/or transmit processor 264 of UE 115, etc.) implementing an IDFT block may generate a time domain signal (z(n)) from a pulse-shaped frequency domain signal (y" (k)), or other signal derived from the frequency domain signal y(k), and provide a reduced PAPR waveform according to aspects of the present disclosure. The pulse-shaped frequency domain data signal (y" (k)), or other signal derived from the frequency domain signal y(k), may be mapped (e.g., by logic executed by one or more processors, such as controller/processor 240 and/or transmit processor 220 of base station 105, controller/processor 280 and/or transmit processor 264 of UE 115, etc., implementing a resource mapping block) to frequency subcarriers prior to the foregoing inverse transforming according to embodiments.

Although the functions of flows 1100A and 1100B of FIGS. 11A and 11B are described above as being performed in respective flows, functions of the foregoing flows may be combined into a same flow according to embodiments of the disclosure. For example, the functions of blocks 1102 and 1112 may be performed in a same flow (e.g., flow 1100A of FIG. 11A configured to include block 1112 or flow 1100B.

Further, PAPR reduction provided according to aspects of the present disclosure may be applied to various signals, such as signals data (user data, control data, etc.) payload, reference signals, etc. For example, PAPR reduction may be implemented with respect to a demodulation reference signal (DMRS) according to some aspects of the disclosure. The DMRS may, for example, be processed using PAPR reduction processes (e.g., using expanded bandwidth resources, pulse-shaping filtering resources, etc.) to generate a reduced PAPR waveform.

Signaling is provided according to some aspects of the disclosure for facilitating PAPR reduction operation of embodiments. For example, signaling of PAPR shaping capability information and/or PAPR shaping information may be provided in association with PAPR reduction operation.

In accordance with some aspects of the disclosure, a wireless device (e.g., UE 115) may provide information to another wireless device (e.g., base station 105) regarding PAPR shaping capability for implementing PAPR reduction. Such PAPR shaping capability information may, for example, be provided in an initial call setup procedure implemented with respect to the communication link between the UE and base station. For example, if a UE wishes to disclose aspects of its pulse shaping, the UE may do so during the initial call setup procedure when an RRC connection is setup (e.g., PAPR shaping capability information may be part of one or more RRC messages sent from the UE to the network).

In an example, UE 115 may provide PAPR shaping capability information to another wireless device (e.g., base station 105) for use in implementing PAPR reduction. The PAPR information may, for example, comprise information regarding one or more PAPR shaping resources the UE has a capability to implement. In accordance with some aspects of the disclosure, PAPR shaping capability information may include information indicating support for use of expanded bandwidth BW by the UE (e.g., indicating the availability of logic of a CA block as described above, ability to identify, configure, and utilize carrier resources outside of carrier resources allocated for data transmission for use in PAPR shaping, ability to identify, configure, and utilize bandwidth within allocated bandwidth as expanded bandwidth available as PAPR shaping resources carrier resources allocated for data transmission for use in PAPR shaping, etc.). Additionally or alternatively, PAPR shaping capability information may include information indicating support for pulse-shaping filtering by the UE (e.g., indicating the availability of one or more pulse-shaping filter, identifying one or more pulse-shaping filter configurations available to the UE, indicating a particular pulse-shaping filter configuration in use by the UE, etc.). The base station may utilize such PAPR shaping capability information in determining if PAPR reduction is to be implemented with respect to wireless communication with the UE, configuring one or more aspects of PAPR reduction to be implemented, selecting and/or configuring PAPR shaping resources to be implemented, etc.

FIG. 12 shows a flow diagram of operation by a wireless device facilitating PAPR reduction implementation according to aspects of the present disclosure. The functions of flow 1200 of the example shown in FIG. 12 may, for example, be performed by various wireless devices of wireless network 100 (e.g., one or more of base stations 105 and/or UEs 115) for facilitating reduced PAPR DFT-s-OFDM waveforms according to aspects of the present disclosure.

At block 1201 of example flow 1200, a wireless device may signal PAPR shaping capability information regarding one or more PAPR shaping resources the wireless device has a capability to implement. In accordance with some aspects of the disclosure, the PAPR shaping capability information may be signaled by a first wireless device (e.g., one of UE 115 or base station 105) to a second wireless device (e.g., the other one of base station 105 or UE 115) in communication with the first wireless device. For example, logic executed by one or more processors (e.g., controller/processor 240 and/or transmit processor 220 of base station 105, controller/processor 280 and/or transmit processor 264 of UE 115, etc.) implementing a PAPR reduction signaling block may be utilized to determine PAPR shaping capabilities of the wireless device (e.g., by analyzing one or more components of the wireless device available for wireless communications, referencing a configuration database, etc.) and to control transmission (e.g., using transmit processor 220, TX MIMO processor 230, MODs 232a-232t, and antennas 234a-234t of base station 105, transmit processor 264, TX MIMO processor 265, MODs 254a-254r, and antenna 252a-252r of UE 115, etc.) of a PAPR shaping capability signal. Such a PAPR shaping capability signal may, for example, include information regarding capabilities of the wireless device with respect to expanded bandwidth for shaping the signal prior to transmission, pulse-shaping filtering for shaping the signal prior to transmission, etc.

A wireless device may implement at least one PAPR shaping resource of the one or more PAPR shaping resources prior to transmission of a signal, at block 1202. For example, the first wireless device may implement one or more PAPR shaping resources prior to transmission of a signal in a communication link to the second wireless device. The first wireless device may, for example, receive (e.g., using antennas 234a-234t, DEMODs 232a-232t, MIMO detector 236, and receive processor 238 of base station 105, antennas 252a-252r, DEMODs 254a-254r, MIMO detector 256, and receive processor 258 of UE 115, etc.) PAPR shaping information from the second wireless device. In accordance with some aspects of the disclosure, the PAPR shaping information may be received in response to the PAPR shaping capability information signaled by the first wireless device. The implementation of at least one PAPR shaping resource by the first wireless device may be controlled (e.g., by controller/processor 240 and/or transmit processor 220 of base station 105, controller/processor 280 and/or transmit processor 264 of UE 115, etc.) in accordance with the PAPR shaping information received from the second wireless device.

In accordance with some aspects of the disclosure, additionally or alternatively, a wireless device (e.g., base station 105) may provide information to another wireless device (e.g., UE 115) regarding PAPR shaping resource implementation for PAPR reduction. Such PAPR shaping information may, for example, be provided with or in addition to uplink resource allocation information (e.g., uplink resource block (RB) allocation information) provided by the base station to the UE.

In an example, base station 105 may provide PAPR shaping information regarding expanded bandwidth available for PAPR reduction to UE 115 in communication therewith. The UE may utilize this expanded bandwidth PAPR shaping information to adjust the length of a CA added to a signal processed for transmission. For example, in an embodiment where the CA may comprise K resources or tones to be added to the M resources or tones of a frequency domain signal, such that M+K resources or tones are used to generate a reduced PAPR DFT-s-OFDM waveform, information regarding the parameter K may be signaled to the UE. In accordance with some embodiments, expanded bandwidth PAPR shaping information signaling may comprise an absolute number of tones or RBs for the CA. Additionally or alternatively, expanded bandwidth PAPR shaping information signaling may comprise a percentage of the RBs allocated for a data transmission (e.g., K may be defined as a percentage of M). In accordance with some aspects, the expanded bandwidth PAPR shaping information may comprise information with respect to a BET from which expanded bandwidth availability may be determined by the UE. For example, the PAPR shaping information regarding expanded bandwidth may comprise signaling (e.g., one-bit signaling) to control use of a BET by a UE. As an example, if a BET bit of the PAPR shaping information is set to 1, the BET may be selected and the UE may use one or more communication parameters (e.g., MCS, RB allocation, etc.) to reference the BET and determine expanded bandwidth availability. If, however, a BET bit of the PAPR shaping information is set to 0, the UE may interpret this to indicate no expanded bandwidth availability, to await explicit signaling from the base station regarding expanded bandwidth availability, and/or the like.

In another example, base station 105 may additionally or alternatively provide PAPR shaping information regarding pulse-shaping filtering to be implemented by UE 115 for shaping a signal prior to transmission in the uplink. For example, information regarding a particular pulse-shaping filter to be used by the UE, a pulse-shaping filter configuration to be implemented by the UE, etc. may be signaled to the UE. In accordance with some embodiments, pulse-shaping filtering information signaling may or may not mandate the use of a pulse-shaping filter for a particular transmission. According to some aspects, a UE may be enabled to select a pulse-shaping filter for use by the UE. For example, the pulse-shaping filtering PAPR shaping information may indicate that a pulse-shaping filter is to be implemented by the UE without specifying the particular pulse-shaping filter configuration, thus allowing the UE to select the particular pulse-shaping filter to implement. The UE may provide responsive signaling to indicate implementation of particular PAPR shaping resources, the particular configuration of the PAPR shaping resources selected/implemented, etc.

Signaling of PAPR shaping information (e.g., expanded bandwidth PAPR shaping resource information and/or pulse-shaping filtering PAPR shaping resource information) may be provided using various techniques. For example, where configuration of a wireless device for PAPR reduction is implemented over a relatively long time horizon (e.g., on the order of minutes, hours, or days), PAPR shaping information may be provided via radio resource control (RRC) or media access control-control element (MAC-CE) signaling. In accordance with some embodiments where PAPR reduction configuration is implemented over such a relatively long time horizon, dynamic signaling (e.g., via downlink control information (DCI)) may be utilized to initiate implementation of the PAPR shaping resources for PAPR reduction. For example, PAPR shaping information may be provided by RRC and then activated or deactivated with more dynamic signaling (e.g., DCI). Additionally or alternatively, PAPR shaping information may be provided via dynamic signaling (e.g. DCI, such as to provide expanded bandwidth PAPR shaping information and/or pulse-shaping filtering PAPR shaping information as part of the DCI that carriers the uplink grant information), such as where PAPR reduction configuration is implemented over a relatively short time horizon (e.g., on the order of milliseconds or seconds).

FIG. 13 shows a flow diagram of operation by a wireless device facilitating PAPR reduction implementation according to aspects of the present disclosure. The functions of flow 1300 of the example shown in FIG. 13 may, for example, be performed by various wireless devices of wireless network 100 (e.g., one or more of base stations 105 and/or UEs 115) for facilitating reduced PAPR DFT-s-OFDM waveforms according to aspects of the present disclosure.

At block 1301 of example flow 1300, a wireless device may provide resource allocation to another wireless device. For example, a first wireless device (e.g., base station 105) may provide resource allocation for a communication link (e.g., uplink) to a second wireless device (e.g., UE 115). In accordance with some aspects of the disclosure, resource allocation information may be signaled by a first wireless device to a second wireless device via a control channel (e.g., as DCI). Logic executed by one or more processors (e.g., controller/processor 240 and/or transmit processor 220 of base station 105) implementing a communication control block may be utilized to determine resources to be allocated for a communication link and to control transmission (e.g., using transmit processor 220, TX MIMO processor 230, MODs 232*a*-232*t*, and antennas 234*a*-234*t* of base station 105) of resource allocation.

A wireless device may signal PAPR shaping information to another wireless device for implementing PAPR shaping with respect to a signal transmitted using the resource allocation at block 1302. In accordance with some aspects of the disclosure, the PAPR shaping information may be signaled by a first wireless device (e.g., base station 105) to a second wireless device (e.g., UE 115) in communication with the first wireless device. For example, logic executed by one or more processors (e.g., controller/processor 240 and/or transmit processor 220 of base station 105) implementing a PAPR reduction signaling block may be utilized to determine PAPR shaping capabilities of the wireless device (e.g., by analyzing PAPR shaping capability information), to determine if PAPR reduction is to be implemented with respect to a particular signal transmission, to determine (e.g., by analyzing PAPR shaping capability information, one or more communication parameters, such as MCS, RB allocation, etc., and/or the like), and/or to control transmission (e.g., using transmit processor 220, TX MIMO processor 230, MODs 232*a*-232*t*, and antennas 234*a*-234*t* of base station 105) of a PAPR shaping information signal. The PAPR shaping information may, for example, include information regarding shaping the signal by the second wireless device prior to transmission in a communication link. In accordance with aspects of the disclosure, PAPR shaping information may provide information regarding expanded bandwidth available for shaping the signal prior to transmission in the communication link. Additionally or alternatively, PAPR shaping information may provide information regarding pulse-shaping filtering for shaping the signal prior to transmission in the communication link.

Examples have been described above with reference to PAPR shaping for PAPR reduction with respect to a data signal. Concepts of the present disclosure may, however be applied with respect to other signals. For example, PAPR reduction techniques of the present disclosure may be implemented with respect to a signaling demodulation reference signal (DMRS). A DMRS corresponding to a data signal for which PAPR reduction is implemented, such as using expanded bandwidth and/or pulse-shaping filtering, may likewise have PAPR reduction implemented with respect thereto. In accordance with some aspects of the disclosure, it may be determined that a DMRS is to be treated differently than a corresponding data signal (e.g., a CA having a different length is to be used, a pulse-shaping filter having different filter coefficients is to be used, pulse-shaping filtering is or is not to be implemented, etc.). For example, DMRS may benefit from a more stringent PAPR requirement and/or may use a different modulation that the data symbol (e.g., QPSK vs 256-QAM). PAPR shaping information provided according to some embodiments may include information for a DMRS transmitted by a wireless device in association with another transmission (e.g., data signal transmission for which PAPR reduction has been implemented). The DMRS information may, for example, include information regarding whether a pulse-shaping filter is to be used with respect to the DMRS.

Figure 14:
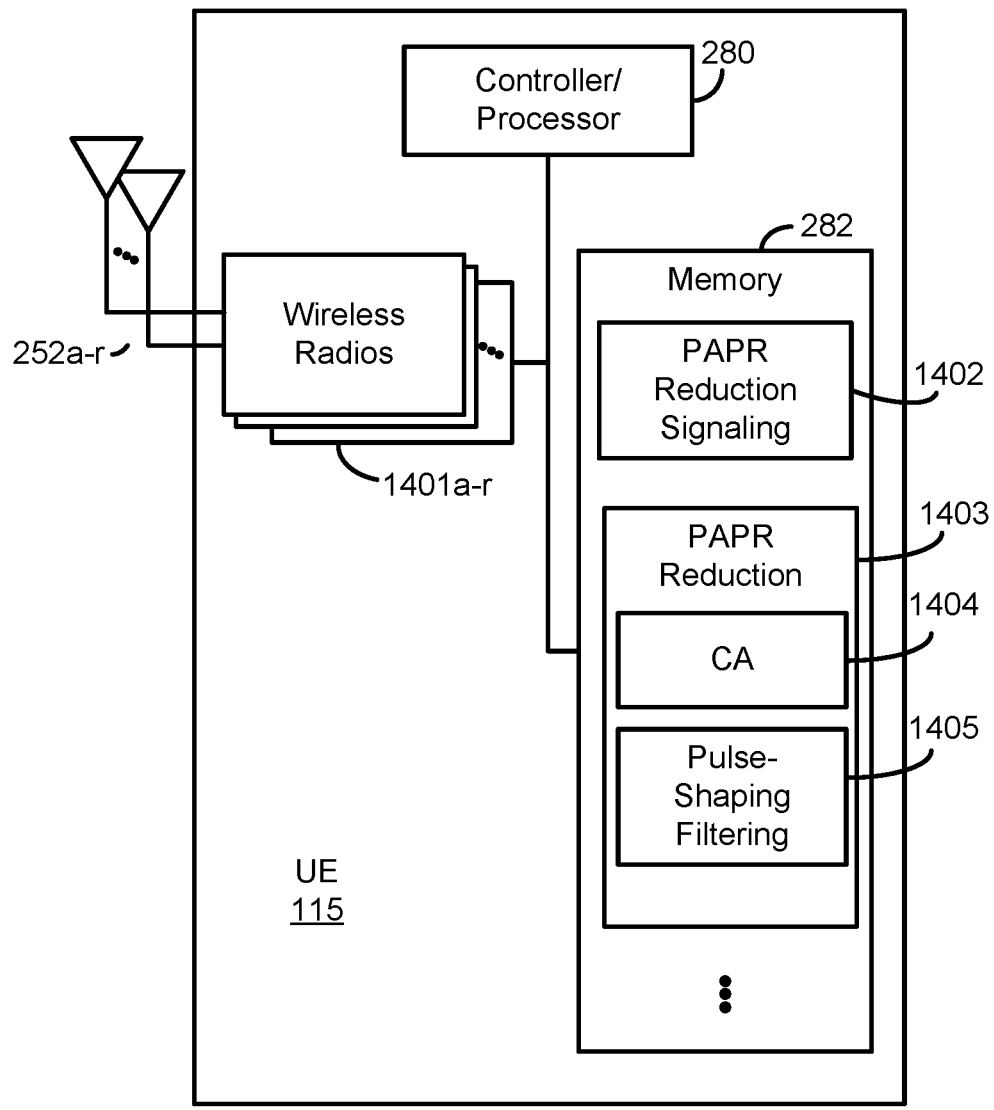
FIG. 14 is a block diagram conceptually illustrating a design of a user equipment (UE) configured for PAPR reduction operation according to some embodiments of the present disclosure.

FIG. 14 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1400*a*-*r* and antennas 252*a*-*r*. Wireless radios 1400*a*-*r* include various components and hardware, as illustrated in FIG. 2 for UE 115, including modulator/demodulators 254*a*-*r*, MIMO detector 256, receive processor 258, transmit processor 264, and TX MIMO processor 266.

One or more algorithms stored by the memory 282 configure processor/controller 280, transmit processor 264, and/or receive processor 258 to carry out one or more procedures relating to wireless communication by UE 115, as previously described. For example, PAPR shaping capability information may be stored in memory 282 and signaled to other wireless devices under control of PAPR reduction signaling logic 1402 in implementing a PAPR reduction technique according to aspects of the present disclosure. PAPR reduction logic 1403 may be utilized by UE 115 in implementing PAPR shaping for PAPR reduction, as described above. PAPR reduction logic 1403, such as may correspond to PAPR reduction circuit 600 described above, includes CA logic 1404 and phase-shaping filtering logic 1405, either or both of which may be implemented for processing a signal for PAPR reduction as described above with respect to CA block 602 and pulse-shaping filter block 603.

Figure 15:
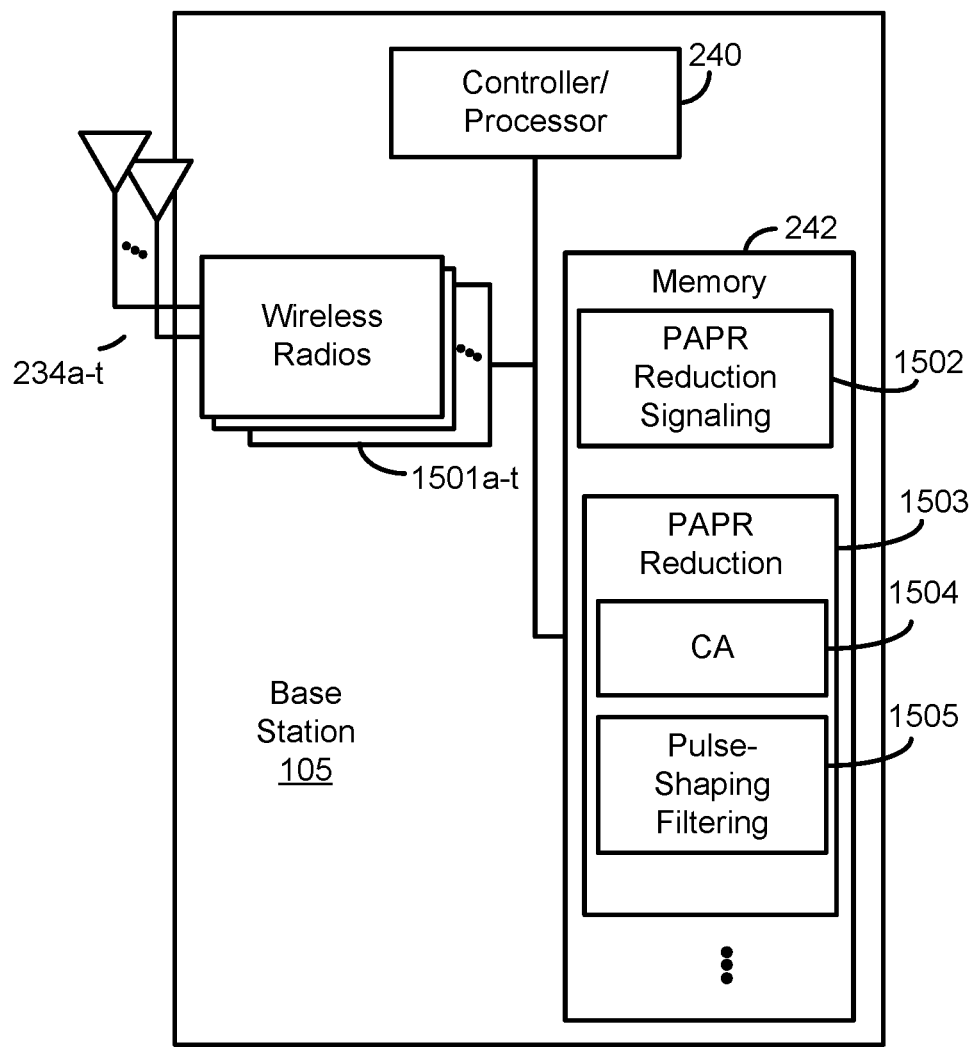
FIG. 15 is a block diagram conceptually illustrating a design of a base station configured to PAPR reduction operation according to some embodiments of the present disclosure.

FIG. 15 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1500*a*-*t* and antennas 234*a*-*t*. Wireless radios 1500*a*-*t* include various components and hardware, as illustrated in FIG. 2 for base station 105, including modulator/demodulators 232*a*-*t*, MIMO detector 236, receive processor 238, transmit processor 220, and TX MIMO processor 230.

One or more algorithms stored by the memory 242 configure processor/controller 240, transmit processor 220, and/or receive processor 238 to carry out one or more procedures relating to wireless communication by base station 105, as previously described. For example, PAPR shaping information may be stored in memory 242 and signaled to other wireless devices under control of PAPR reduction signaling logic 1502 in implementing a PAPR reduction technique according to aspects of the present disclosure. PAPR reduction logic 1503 may be utilized by base station 105 in implementing PAPR shaping for PAPR reduction, as described above. PAPR reduction logic 1503, such as may correspond to PAPR reduction circuit 600 described above, includes CA logic 1504 and phase-shaping filtering logic 1505, either or both of which may be implemented for processing a signal for PAPR reduction as described above with respect to CA block 602 and pulse-shaping filter block 603.

In some examples of methods, apparatuses, and articles described herein, various aspects of multi-slot transport block techniques may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for providing, by a first wireless device, resource allocation to a second wireless device, and signaling, by the first wireless device, PAPR shaping information to the second wireless device for implementing PAPR shaping with respect to a signal transmitted using the resource allocation, wherein the PAPR shaping information includes information regarding shaping the signal by the second wireless device prior to transmission in a communication link.

2. The methods, apparatuses, and articles of clause 1, wherein the PAPR shaping information includes information regarding one or more PAPR shaping resources for PAPR shaping and PAPR shaping implementation information.

3. The methods, apparatuses, and articles of any of clauses 1-2, wherein the first wireless device comprises a base station, the second wireless device comprises a UE, the resource allocation comprises an uplink resource allocation, and the communication link comprises the uplink.

4. The methods, apparatuses, and articles of any of clauses 1-3, wherein the PAPR shaping information includes information regarding expanded bandwidth available for shaping the signal prior to transmission in the communication link.

5. The methods, apparatuses, and articles of clause 4, wherein the PAPR shaping information comprises information regarding a length of CA configured for PAPR shaping added by the second wireless device when processing the signal for transmission in the communication link, wherein the length of the CA corresponds to the expanded bandwidth.

6. The methods, apparatuses, and articles of clause 5, wherein the CA comprises a CP, a CS, or a combination thereof.

7. The methods, apparatuses, and articles of any of clauses 5-6, wherein the information regarding the length of the CA comprises a number frequency resources of the expanded bandwidth.

8. The methods, apparatuses, and articles of any of clauses 5-7, wherein the information regarding the length of the CA comprises a size of the expanded bandwidth relative to the resource allocation.

9. The methods, apparatuses, and articles of any of clauses 4-8, wherein the PAPR shaping information comprises information regarding a bandwidth extension table from which the expanded bandwidth is determined.

10. The methods, apparatuses, and articles of any of clauses 4-9, wherein signaling the PAPR shaping information provides for using RRC or MAC CE signaling to provide information regarding the expanded bandwidth.

11. The methods, apparatuses, and articles of any of clauses 4-10, wherein signaling the PAPR shaping information provides for using DCI signaling to dynamically provide information regarding the expanded bandwidth.

12. The methods, apparatuses, and articles of clause 11, wherein the DCI signaling includes both the resource allocation and the information regarding the expanded bandwidth.

13. The methods, apparatuses, and articles of any of clauses 1-12, wherein the PAPR shaping information includes information regarding pulse-shaping filtering for shaping the signal prior to transmission in the communication link.

14. The methods, apparatuses, and articles of clause 13, wherein the PAPR shaping information comprises information regarding whether pulse-shaping filtering is to be implemented by the second wireless device for a signal transmitted in the communication link.

15. The methods, apparatuses, and articles of any of clauses 13-14, wherein the PAPR shaping information comprises information regarding a pulse-shaping filter to be used by the second wireless device.

16. The methods, apparatuses, and articles of any of clauses 13-15, wherein signaling the PAPR shaping information provides for using RRC or MAC CE signaling to provide information regarding the pulse-shaping filtering.

17. The methods, apparatuses, and articles of any of clauses 13-16, wherein signaling the PAPR shaping information provides for using DCI signaling to dynamically provide information regarding the pulse-shaping filtering.

18. The methods, apparatuses, and articles of clause 17, wherein the DCI signaling includes both the resource allocation and the information regarding the pulse-shaping filtering.

19. The methods, apparatuses, and articles of any of clauses 13-18, further providing for signaling DMRS information for a DMRS transmitted by the second wireless device in association with the transmission in the communication link, wherein the DMRS information includes information regarding whether a pulse-shaping filter is to be used by the second wireless device with respect to the DMRS transmitted by the second wireless device.

20. Methods, apparatuses, and articles for wireless communication may provide for signaling, by a first wireless device to a second wireless device in communication with the first wireless device, PAPR shaping capability information regarding one or more PAPR shaping resources the first wireless device has a capability to implement, and implementing, by the first wireless device, at least one PAPR shaping resource of the one or more PAPR shaping resources prior to transmission of a signal in a communication link to the second wireless device.

21. The methods, apparatuses, and articles of clause 20, wherein the first wireless device comprises a UE, the second wireless device comprises a base station, and the communication link comprises an uplink.

22. The methods, apparatuses, and articles of any of clauses 20-21, wherein the one or more PAPR shaping resources the first wireless device has a capability to implement includes expanded bandwidth available for shaping the signal prior to transmission in the uplink.

23. The methods, apparatuses, and articles of any of clauses 20-22, wherein the one or more PAPR shaping resources the first wireless device has a capability to implement includes pulse-shaping filtering for shaping the signal prior to transmission in the uplink.

24. The methods, apparatuses, and articles of clause 23, wherein the PAPR shaping capability information includes information regarding a pulse-shaping filter implemented by the first wireless device.

25. The methods, apparatuses, and articles of any of clauses 20-24, wherein signaling the PAPR shaping capability information provides for providing the PAPR shaping capability information in an initial call setup procedure implemented with respect to the communication link between the first wireless device and the second wireless device.

26. The methods, apparatuses, and articles of any of clauses 20-25, further providing for receiving, by the first wireless device from the second wireless device, PAPR shaping information, wherein the PAPR shaping information is responsive to the PAPR shaping capability information signaled by the first wireless device, and wherein the implementing at least one PAPR shaping resource is in accordance with the PAPR shaping information received from the second wireless device.

27. The methods, apparatuses, and articles of clause 26, further providing for receiving, by the first wireless device from the second wireless device, DMRS information, wherein DMRS information is responsive to the PAPR shaping capability information signaled by the first wireless device, and wherein the DMRS information includes information regarding whether a pulse-shaping filter is to be used by the first wireless device with respect to the DMRS transmitted by the first wireless device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to PAPR reduction may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 11A, 11B, 12, and 13) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a web site, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
providing, by a first wireless device, resource allocation to a second wireless device; and
signaling, by the first wireless device, peak to average power ratio (PAPR) shaping information to the second wireless device for implementing PAPR shaping with respect to a signal transmitted using the resource allocation, wherein the PAPR shaping information includes information regarding expanded bandwidth available for shaping the signal by the second wireless device prior to transmission in a communication link, and wherein the expanded bandwidth comprises carrier resources outside of the resource allocation.

2. The method of claim 1, wherein the PAPR shaping information includes information regarding one or more PAPR shaping resources for PAPR shaping and PAPR shaping implementation information.

3. The method of claim 1, wherein the PAPR shaping information comprises information regarding a bandwidth extension table from which the expanded bandwidth is determined.

4. The method of claim 1, wherein the PAPR shaping information comprises information regarding a length of cyclic affix (CA) configured for PAPR shaping added by the second wireless device when processing the signal for transmission in the communication link, wherein the length of the CA corresponds to the expanded bandwidth.

5. The method of claim 4, wherein the information regarding the length of the CA comprises a number frequency resources of the expanded bandwidth, a size of the expanded bandwidth relative to the resource allocation, or a combination thereof.

6. The method of claim 1, wherein signaling the PAPR shaping information comprises:
using radio resource control (RRC) or media access control (MAC) control element (CE) signaling to provide information regarding the expanded bandwidth, downlink control information (DCI) signaling to dynamically provide information regarding the expanded bandwidth, or a combination thereof.

7. The method of claim 1, wherein the PAPR shaping information includes information regarding pulse-shaping filtering for shaping the signal prior to transmission in the communication link.

8. The method of claim 7, wherein signaling the PAPR shaping information comprises:
using radio resource control (RRC) or media access control (MAC) control element (CE) signaling to provide information regarding the pulse-shaping filtering, downlink control information (DCI) signaling to dynamically provide information regarding the pulse-shaping filtering, or a combination thereof.

9. The method of claim 7, further comprising:
signaling demodulation reference signal (DMRS) information for a DMRS transmitted by the second wireless device in association with the transmission in the communication link, wherein the DMRS information includes information regarding whether a pulse-shaping filter is to be used by the second wireless device with respect to the DMRS transmitted by the second wireless device.

10. An apparatus configured for wireless communication, the apparatus comprising:
at least one processor; and
a memory coupled to the at least one processor, wherein the at least one processor is configured:
to provide, by a first wireless device, resource allocation to a second wireless device; and
to signal, by the first wireless device, peak to average power ratio (PAPR) shaping information to the second wireless device for implementing PAPR shaping with respect to a signal transmitted using the resource allocation, wherein the PAPR shaping information includes information regarding expanded bandwidth available for shaping the signal by the second wireless device prior to transmission in a communication link, and wherein the expanded bandwidth comprises carrier resources outside of the resource allocation.

11. The apparatus of claim 10, wherein the PAPR shaping information includes information regarding one or more PAPR shaping resources for PAPR shaping and PAPR shaping implementation information.

12. The apparatus of claim 10, wherein the PAPR shaping information comprises information regarding a bandwidth extension table from which the expanded bandwidth is determined.

13. The apparatus of claim 10, wherein the PAPR shaping information comprises information regarding a length of cyclic affix (CA) configured for PAPR shaping added by the second wireless device when processing the signal for transmission in the communication link, wherein the length of the CA corresponds to the expanded bandwidth.

14. The apparatus of claim 13, wherein the information regarding the length of the CA comprises a number frequency resources of the expanded bandwidth, a size of the expanded bandwidth relative to the resource allocation, or a combination thereof.

15. The apparatus of claim 10, wherein the at least one processor configured to signal the PAPR shaping information is configured:
to use radio resource control (RRC) or media access control (MAC) control element (CE) signaling to provide information regarding the expanded bandwidth, downlink control information (DCI) signaling to dynamically provide information regarding the expanded bandwidth, or a combination thereof.

16. The apparatus of claim 10, wherein the PAPR shaping information includes information regarding pulse-shaping filtering for shaping the signal prior to transmission in the communication link.

17. The apparatus of claim 16, wherein the at least one processor configured to signal the PAPR shaping information is configured:
to use radio resource control (RRC) or media access control (MAC) control element (CE) signaling to provide information regarding the pulse-shaping filtering, downlink control information (DCI) signaling to dynamically provide information regarding the pulse-shaping filtering, or a combination thereof.

18. The apparatus of claim 16, wherein the one or more processor is further configured:
to signal demodulation reference signal (DMRS) information for a DMRS transmitted by the second wireless device in association with the transmission in the communication link, wherein the DMRS information includes information regarding whether a pulse-shaping filter is to be used by the second wireless device with respect to the DMRS transmitted by the second wireless device.

19. A method of wireless communication, comprising:
signaling, by a first wireless device to a second wireless device in communication with the first wireless device, peak to average power ratio (PAPR) shaping capability information regarding one or more PAPR shaping resources the first wireless device has a capability to implement, wherein the one or more PAPR shaping resources the first wireless device has a capability to implement includes expanded bandwidth for shaping a signal prior to transmission in an uplink, and wherein the expanded bandwidth comprises carrier resources outside of a resource allocation provided to the first wireless device for transmission in the uplink; and implementing, by the first wireless device, at least one PAPR shaping resource of the one or more PAPR shaping resources prior to transmission of the signal in the uplink to the second wireless device.

20. The method of claim 19, wherein the one or more PAPR shaping resources the first wireless device has a capability to implement includes pulse-shaping filtering for shaping the signal prior to transmission in the uplink.

21. The method of claim 19, further comprising:
receiving, by the first wireless device from the second wireless device, PAPR shaping information, wherein the PAPR shaping information is responsive to the PAPR shaping capability information signaled by the first wireless device, and wherein the implementing at least one PAPR shaping resource is in accordance with the PAPR shaping information received from the second wireless device.

22. The method of claim 21, further comprising:
receiving, by the first wireless device from the second wireless device, demodulation reference signal (DMRS) information, wherein DMRS information is responsive to the PAPR shaping capability information signaled by the first wireless device, and wherein the DMRS information includes information regarding whether a pulse-shaping filter is to be used by the first wireless device with respect to the DMRS transmitted by the first wireless device.

23. An apparatus configured for wireless communication, the apparatus comprising:
at least one processor; and
a memory coupled to the at least one processor, wherein the at least one processor is configured:
to signal, by a first wireless device to a second wireless device in communication with the first wireless device, peak to average power ratio (PAPR) shaping capability information regarding one or more PAPR shaping resources the first wireless device has a capability to implement, wherein the one or more PAPR shaping resources the first wireless device has a capability to implement includes expanded bandwidth for shaping a signal prior to transmission in an uplink, and wherein the expanded bandwidth comprises carrier resources outside of a resource allocation provided to the first wireless device for transmission in the uplink;
to implement, by the first wireless device, at least one PAPR shaping resource of the one or more PAPR shaping resources prior to transmission of the signal in the uplink to the second wireless device.

24. The apparatus of claim 23, wherein the one or more PAPR shaping resources the first wireless device has a capability to implement includes pulse-shaping filtering for shaping the signal prior to transmission in the uplink.

25. The apparatus of claim 23, wherein the at least one processor is further configured:
to receive, by the first wireless device from the second wireless device, PAPR shaping information, wherein the PAPR shaping information is responsive to the PAPR shaping capability information signaled by the first wireless device, and wherein implementing at least one PAPR shaping resource is in accordance with the PAPR shaping information received from the second wireless device.

26. The apparatus of claim 25, wherein the at least one processor is further configured:
to receive, by the first wireless device from the second wireless device, demodulation reference signal (DMRS) information, wherein DMRS information is responsive to the PAPR shaping capability information signaled by the first wireless device, and wherein the DMRS information includes information regarding whether a pulse-shaping filter is to be used by the first wireless device with respect to the DMRS transmitted by the first wireless device.

* * * * *